(12) United States Patent
Ushioda

(10) Patent No.: US 6,178,396 B1
(45) Date of Patent: Jan. 23, 2001

(54) WORD/PHRASE CLASSIFICATION PROCESSING METHOD AND APPARATUS

(75) Inventor: Akira Ushioda, Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 08/828,901

(22) Filed: Mar. 31, 1997

(30) Foreign Application Priority Data

Aug. 2, 1996 (JP) .................................................. 8-204986

(51) Int. Cl.$^7$ ............................. G06F 17/20; G06F 17/27
(52) U.S. Cl. ..................................................... 704/1; 704/9
(58) Field of Search .................................. 704/1, 2, 7, 9, 704/245, 255, 257

(56) References Cited

U.S. PATENT DOCUMENTS

| | | | |
|---|---|---|---|
| 5,805,832 | * 9/1998 | Brown et al. | 704/9 |
| 5,809,476 | * 9/1998 | Ryan | 704/9 |
| 5,819,221 | * 10/1998 | Kondo et al. | 704/255 |
| 5,963,965 | * 10/1999 | Vogel | 704/9 |

OTHER PUBLICATIONS

Ushioda, "Hierarchical Clustering of Words" Fourth Workshop on Very Large Corporations, Aug. 4, 1996.
Ushioda, "Hierarchical Clustering of Words and Application to NLP Tasks", COLING–96, Aug. 5, 1996.
Bellegarda et al., "A Novel Word Clustering Algorithm Based on Latent Semantic Analysis", ICASSSP, May 1–10, 1996, pp. 172–175.*
Miller et al., "Evaluation of a Language Model Using a Clustered Model Backoff" ICASSP, May 7–10, 1996, pp.*
Farhat et al., "Cluatering Words For Statistical Language Models Based on Nontextual Word Similarity" ICASSP, May 7–10, 1996, pp. 180–183.*

* cited by examiner

Primary Examiner—Forester W. Isen
Assistant Examiner—Patrick N. Edouard
(74) Attorney, Agent, or Firm—Staas & Halsey, LLP

(57) ABSTRACT

A token is attached to a word class sequence whose probability of appearance in text data is equal to or more than a predetermined value. A set of words and tokens included in a word/token sequence concerning the text data, is separated so that a probability of generation of the word/token sequence concerning the text data becomes the highest. The token is then replaced with a phrase included in the text data.

15 Claims, 26 Drawing Sheets

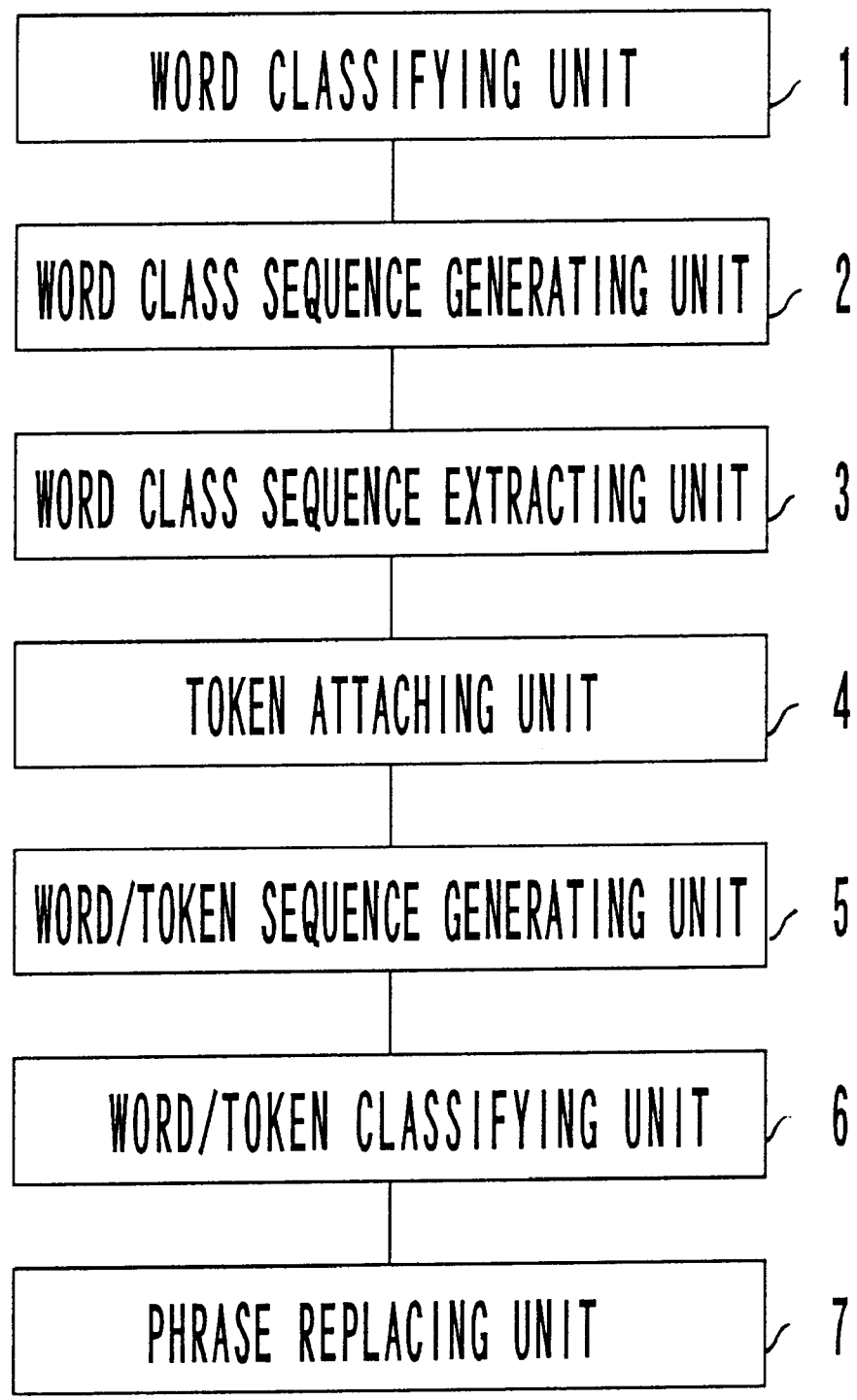
F I G. 1

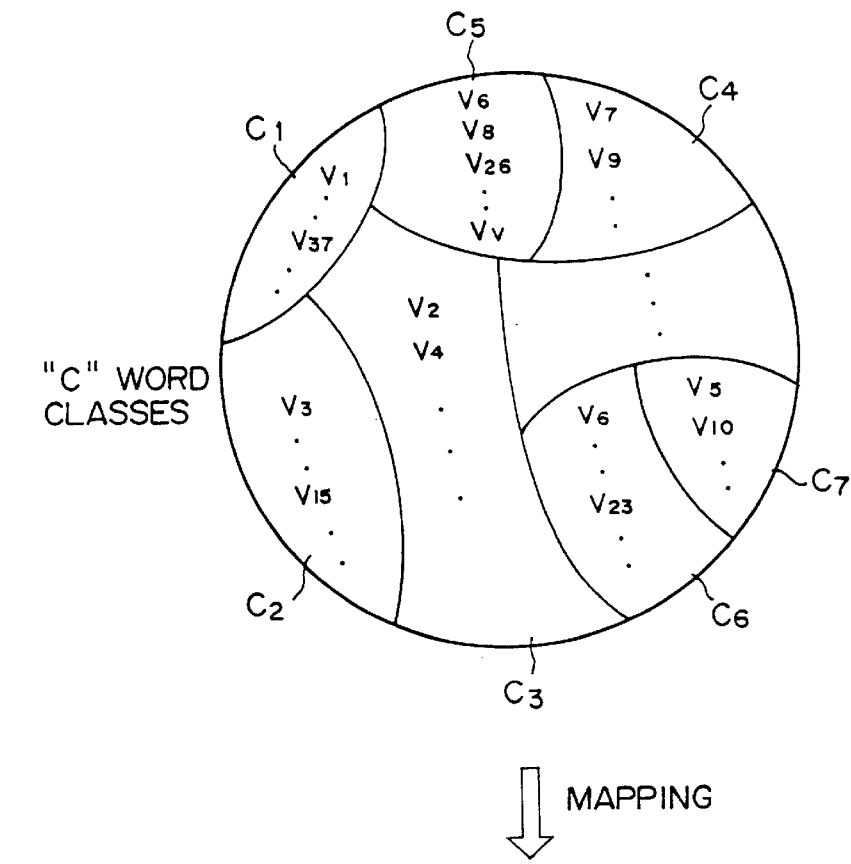
"C" WORD CLASSES
⇩ MAPPING
ONE-DIMENSIONAL SEQUENCE OF WORDS IN TEXT DATA
$W_1$ $W_2$ $W_3$ $W_4$ $W_5$ $W_6$ $W_7$ $W_8$ $W_9$ $W_{10}$ - - - $W_T$
WORDS AS VOCABULARY
$(V_{15})$ $(V_2)$ $(V_{23})$ $(V_4)$ $(V_5)$ $(V_{15})$ $(V_5)$ $(V_{26})$ $(V_{37})$ $(V_2)$ - - - $(V_8)$
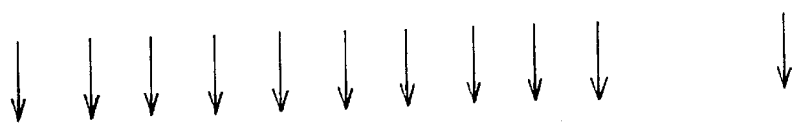
ONE-DIMENSIONAL SEQUENCE OF WORD CLASSES OF TEXT DATA
$C_2$ $C_3$ $C_6$ $C_3$ $C_7$ $C_2$ $C_7$ $C_5$ $C_1$ $C_3$ - - - $C_5$
FIG. 4

TEXT DATA ⇒ ONE-DIMENSIONAL SEQUENCE OF WORDS : $W_1$ $W_2$ $W_3$ $W_4$ $W_5$ $W_6$ $W_7$ --- $W_T$

ONE-DIMENSIONAL SEQUENCE OF WORD CLASSES : $C_2$ $C_3$ $C_6$ $C_3$ $C_7$ $C_2$ $C_7$ --- $C_5$

CALCULATING $MI(C_i, C_j)$ : ○ × × ○ ○ × ---

EXTRACTING CLASS CHAINS : $C_2 - C_3$   $C_3 - C_7 - C_2$ $C_i$ $C_j$  ⇒  $MI(C_i, C_j) \geq TH$
⌊___⌋
  ○

| CLASS CHAIN | | TOKEN |
|---|---|---|
| $C_1 - C_3$ | $\rightarrow$ | $t_1$ |
| $C_1 - C_7$ | $\rightarrow$ | $t_2$ |
| ⋮ | | ⋮ |
| $C_2 - C_3$ | $\rightarrow$ | $t_3$ |
| $C_2 - C_{11}$ | $\rightarrow$ | $t_4$ |
| ⋮ | | ⋮ |
| $C_{300} - C_{32}$ | $\rightarrow$ | $t_5$ |
| ⋮ | | ⋮ |
| $C_1 - C_3 - C_{80}$ | $\rightarrow$ | $t_6$ |
| $C_1 - C_4 - C_5$ | $\rightarrow$ | $t_7$ |
| $C_3 - C_7 - C_2$ | $\rightarrow$ | $t_8$ |
| ⋮ | | ⋮ |
| $C_1 - C_9 - C_{11} - C_{32}$ | $\rightarrow$ | $t_9$ |
| ⋮ | | ⋮ |

FIG. 7

```
                        6
   ┌─────────────────────────────────────────┐
   │      WORD/TOKEN CLASSIFYING UNIT        │
   │  ┌───────────────────────────────┐ 140  │
   │  │ INITIALIZATION CLASS ASSIGNING UNIT │ │
   │  └───────────────────────────────┘      │
   │                                          │
   │  ┌───────────────────────────────┐ 141  │
   │  │     TEMPORARY MERGING UNIT    │      │
   │  └───────────────────────────────┘      │
   │                                          │
   │  ┌───────────────────────────────┐ 142  │
   │  │ AVERAGE MUTUAL INFORMATION AMOUNT │  │
   │  │ CALCULATING UNIT              │      │
   │  └───────────────────────────────┘      │
   │                                          │
   │  ┌───────────────────────────────┐ 143  │
   │  │        MERGING UNIT           │      │
   │  └───────────────────────────────┘      │
   └─────────────────────────────────────────┘
```

FIG. 10

(A) CLASS CHAIN  $C_{300}$ —— $C_{32}$
(TOKEN)  $(\uparrow_5)$ (B) PHRASE CANDIDATES

⬇ SCANNING TEXT DATA (C) PHRASES     Nissan —— truck

Toyota —— wagon

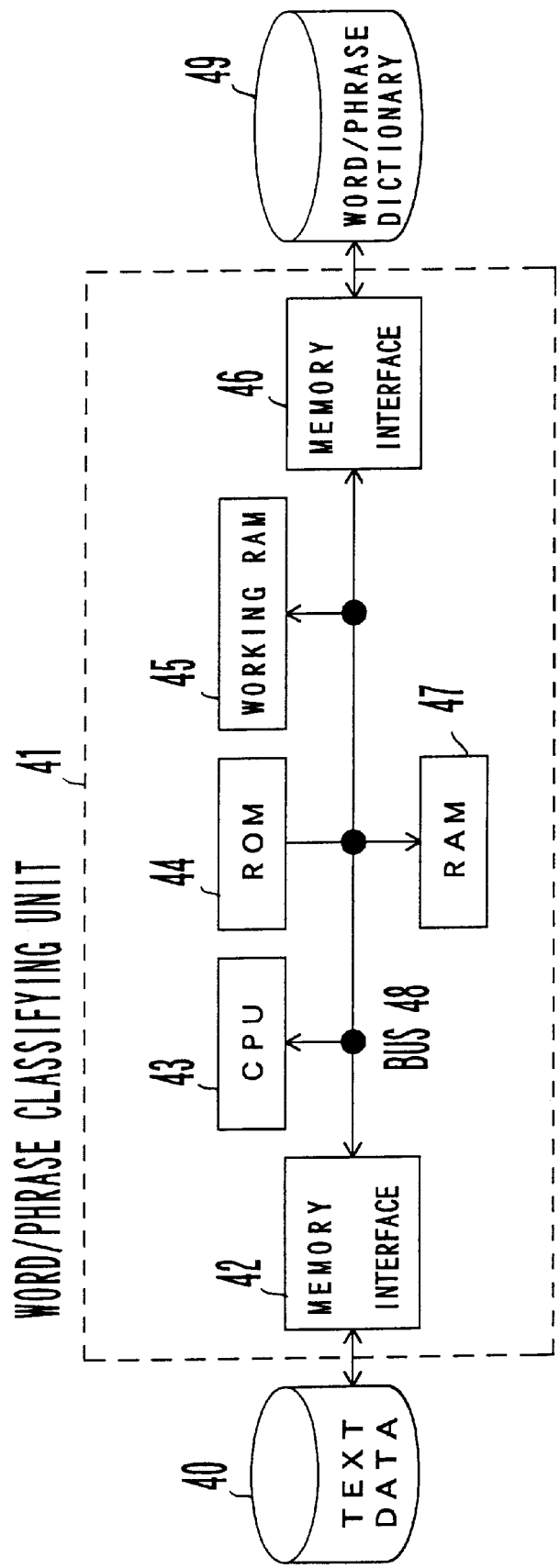
F I G. 13

WORD/PHRASE CLASSIFICATION PROCESSING METHOD AND APPARATUS

BACKGROUND OF THE INVENTION

1. Field of the Invention

The present invention relates to a word/phrase classification processing method, phrase extraction method, word/phrase classification processing apparatus, speech recognition apparatus, machine translation apparatus, phrase extraction apparatus, and a word/phrase storage medium. Particularly, the present invention is suitable for extracting phrases from text data and automatically classifying words and phrases.

2. Description of the Related Art

One type of conventional word classification processing apparatus automatically classifies a single word by statistically processing the single word used in text data, and performs speech recognition and machine translation using the result of classifying the word, for example, as recited in the document titled "Brown, P., Della Pietra, V., deSouza, P., Lai, J., Mercer, R. (1992) "Class-Based n-gram Models of Natural Language". Computational Linguistics, Vol. 18, No. 4, pp. 467–479".

However, the conventional word classification processing apparatuses cannot automatically classify words and phrases together, and cannot perform speech recognition and machine translation using the correspondence or similarity between word and phrase or between phrases. Therefore, they cannot perform the speech recognition or machine translation accurately.

SUMMARY OF THE INVENTION

A first object of the present invention is to provide a word/phrase classification processing apparatus and method thereof which can automatically classify word and phrase as one block.

A second object of the present invention is to provide a phrase extraction apparatus which can extract a phrase from a large amount of text data at a high speed.

A third object of the present invention is to provide a speech recognition apparatus which can perform accurate speech recognition using the correspondence or similarity between word and phrase or between phrases.

A fourth object of the present invention is to provide a machine translation apparatus which can perform accurate machine translation using the correspondence or similarity between word and phrase or between phrases.

To attain the above described first object, word and phrase included in text data are classified together to generate a class in which the word and phrase exist together, according to the present invention.

With such a class, not only words, but word and phrase or phrases can be classified as one block, thereby easily identifying the correspondence or similarity between the word and phrase or between the phrases.

Furthermore, according to an embodiment of the present invention, a one-dimensional sequence of word classes is generated by mapping word classes into which words are classified, into a one-dimensional sequence of words included in text data. Then, a word class sequence in which all of the degrees of stickiness between contiguous word classes are equal to or more than a predetermined value, is extracted from the one-dimensional sequence of word classes of the text data and has a token attached. After word and token are classified together, a word class sequence corresponding to the token is replaced with a phrase belonging to that word class sequence.

As described above, a token is attached to a word class sequence to regard that sequence as one word. As a result, equal handling of a word included in text data and a word class sequence with a token attached allows classification processing to be performed without making a distinction between word and phrase. Additionally, a phrase is extracted based on the degree of stickiness between contiguous word classes by mapping word classes into which words are classified into a one-dimensional sequence of words included in text data to generate a one-dimensional sequence of word classes, so that the phrase can be extracted from the text data at high speed.

Additionally, to attain the above described second object, word classes into which words are classified are mapped to a one-dimensional sequence of words included in text data to generate a one-dimensional sequence of word classes. Then, a word class sequence in which all of the degrees of stickiness between contiguous word classes are equal to or more than a predetermined value, is extracted from the one-dimensional sequence of word classes of text data, so that a phrase is extracted by taking out respective words existing contiguously in the text data from respective word classes structuring the word class sequence, according to the present invention.

With such a process, a phrase can be extracted based on a word class sequence. Since the number of word classes into which different words in text data are classified is smaller than the number of the different words, extracting a word class sequence in which all of the degrees of stickiness between contiguous word classes are equal to or more than a predetermined value from a one-dimensional sequence of word classes of text data, allows a reduction in the amount of operations and a memory capacity, a quicker performance of a process for extracting a phrase, and a saving of memory resources, compared with extracting a word sequence in which all of the degrees of stickiness between contiguous words are equal to or more than a predetermined value, from a one-dimensional sequence of words included in the text data. Note that a word class sequence may sometimes include a word sequence which does not exist in a one-dimensional sequence of words in text data. In this case, respective words existing contiguously in the text data are extracted from respective word classes structuring the word class sequence, and the extracted words are recognized as a phrase.

Furthermore, to attain the above described third object, speech is recognized by referencing a word/phrase dictionary for classifying word and phrase in predetermined text data as a class in which the word and phrase exist together, and storing the class, according to the present invention.

With such a process, speech recognition can be performed using the correspondence or similarity between word and phrase or between phrases, thereby enabling an accurate process.

Still further, to attain the above described fourth object, an input original sentence is corresponded to an original sentence sample stored in a sample sentence book, based on a word/phrase dictionary for classifying word and phrase in predetermined text data as a class in which the word and phrase exist together, according to the present invention.

Accordingly, even if an original sentence which is a variation of an original sentence sample stored in the sample sentence book, and includes a phrase replacing an original word in the original sentence sample, is input, the original sentence sample is applied to the input original sentence, so that machine translation can be performed. Therefore, accurate machine translation using the correspondence or similarity between word and phrase or between phrases, can be realized.

BRIEF DESCRIPTION OF THE DRAWINGS

FIG. 1 shows a functional block diagram of a word/phrase classification processing apparatus according to an embodiment of the present invention;

FIG. 4 is a schematic diagram showing a word class sequence generation process performed by the word/phrase classification processing apparatus according to the embodiment of the present invention;

FIG. 5 is a schematic diagram showing a class chain extraction process performed by the word/phrase classification processing apparatus according to the embodiment of the present invention;

FIG. 7 is a schematic diagram showing a relationship between a class chain and a token built by the word/phrase classification processing apparatus according to the embodiment of the present invention;

FIG. 10 shows a functional block diagram of the word/token classifying unit shown in FIG. 1;

FIG. 13 is a block diagram showing the configuration of the word/phrase classification processing apparatus according to the embodiment of the present invention;

DETAILED DESCRIPTION OF THE PREFERRED EMBODIMENT

Figure 2:
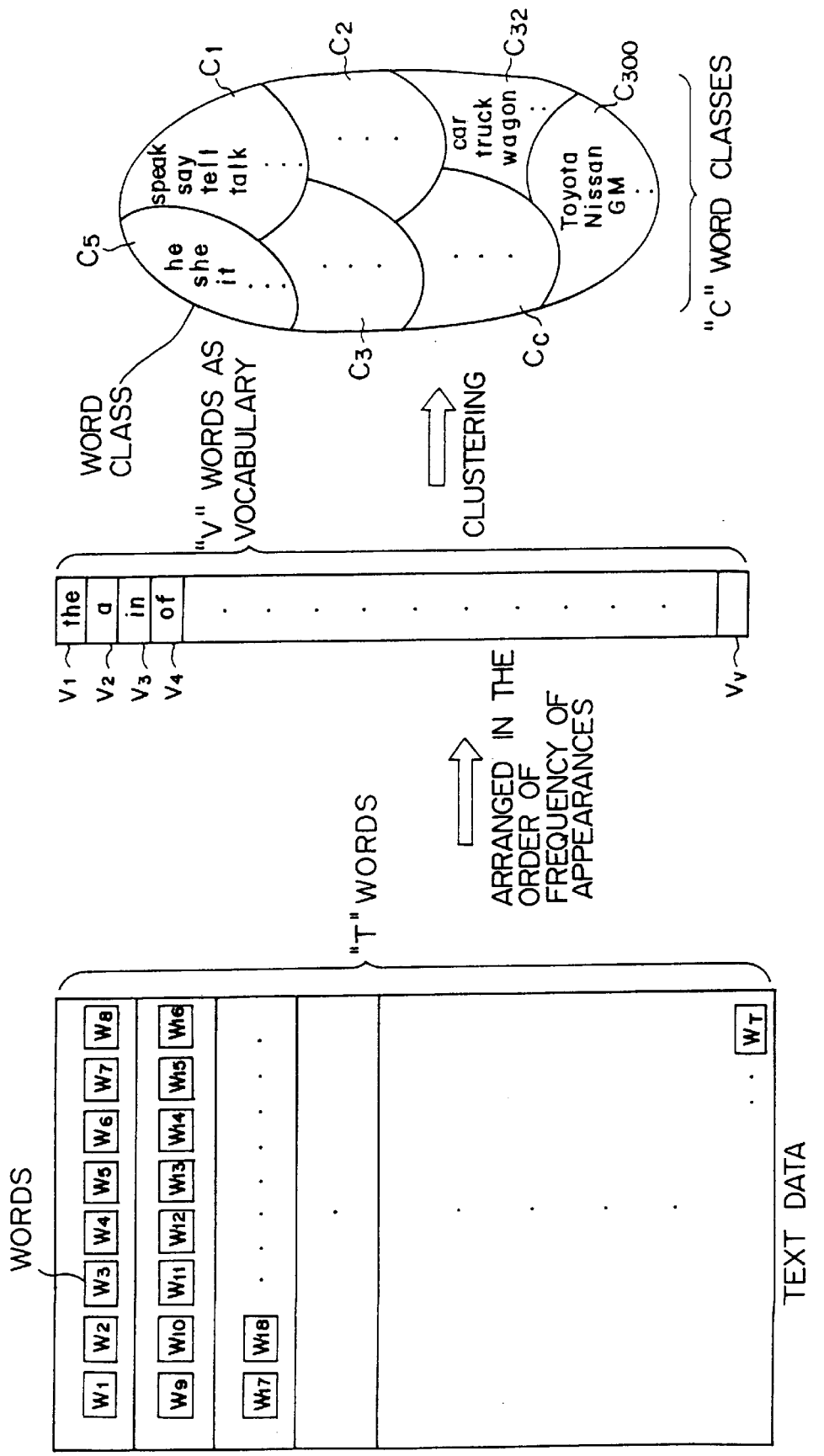
FIG. 2 is a schematic diagram showing a word clustering process performed by the word/phrase classification processing apparatus according to the embodiment of the present invention.

Provided below is the explanation about a word/phrase classification processing apparatus according to an embodiment of the present invention, by referring to the drawings. This embodiment is intended to classify word and phrase included in predetermined text data into a class in which the word and phrase exist together.

FIG. 1 shows a functional block diagram of a word/phrase classification processing apparatus according to an embodiment of the present invention.

The word/phrase classification processing apparatus shown in FIG. 1 comprises a word classifying unit 1, word class sequence generating unit 2, word class sequence extracting unit 3, token attaching unit 4, word/token sequence generating unit 5, word/token classifying unit 6, and a phrase replacing unit 7.

The word classifying unit 1 extracts different words from a one-dimensional sequence of words in text data, and generates a word class by dividing a set of extracted words.

FIG. 2 shows a process performed by the word classifying unit 1. This process generates "V" words $\{V_1, V_2, V_3, V_4, \ldots, V_v\}$ as a vocabulary arranged in the order of the frequency of appearances in text data, from a one-dimensional sequence of word $(W_1\ W_2\ W_3\ W_4\ \ldots, W_T)$ composed of "T" words included in the text data, and assigns an initialization class to each of the "V" words $\{V_1, V_2, V_3, V_4, \ldots, V_v\}$ as the vocabulary. Here, the number of words "T" is, for example, 50,000,000, and the number of words as the vocabulary "V" is, for example, 7,000.

FIG. 2 exemplifies the case in which words with a high frequency of appearances in text data such as "the", "a", "in", and "of" respectively correspond to the words $V_1$, $V_2$, $V_3$, and $V_4$ as the vocabulary. The "V" words $\{V_1, V_2, V_3, V_4, \ldots, V_v\}$ as the vocabulary to each of which an initialization class is assigned are divided into "C" word classes $\{C_1, C_2, C_3, C_4, \ldots, C_c\}$ by using clustering. Here, the number of word classes "C" is, for example, 500.

FIG. 2 also exemplifies the case in which words such as "speak", "say", "tell", "talk", . . . are classified as a word class $C_1$; words such as "he", "she", "it", . . . are classified as a word class $C_5$; words such as "car", "truck", "wagon", . . . are classified as a word class $C_{32}$; and words such as "Toyota", "Nissan", and "GM", . . . are classified as a word class $C_{300}$.

The "V" words $\{V_1, V_2, V_3, V_4, \ldots, V_v\}$ as the vocabulary are classified by, for example, uniting two word classes to which words in the text data belong, to minimize a decrease in the probability of generating original text data when they are merged as one class. Here, the probability of generating original text data according to bigram class model can be represented using an average mutual information AMI, which can be obtained by the following equation.

$$AMI = \sum_{C_i C_j} P_r(C_i, C_j) \log \frac{P_r(C_i, C_j)}{P_r(C_i) \cdot P_r(C_j)} \quad (1)$$

where $P_r(C_i)$ is the probability of appearances of the class $C_i$ in a one-dimensional sequence of word classes of text data, on the condition that words in a one-dimensional sequence of words $(W_1 W_2 W_3 W_4 \ldots W_T)$ in the text data, are replaced with the word classes to which the words belong;

$P_r(C_j)$ is the probability of appearances of the class $C_j$ in the one-dimensional sequence of word classes of the text data, on the condition that the words in the one-dimensional sequence of words $(W_1 W_2 W_3 W_4 \ldots W_T)$ included in the text data are replaced with the word classes to which the words belong; and $P_r(C_i, C_j)$ is the probability of appearances of the word class $C_j$ existing contiguously to the word class $C_i$ in the one-dimensional sequence of word classes of the text data, on the condition that the words in the one-dimensional sequence of words in the text data $(W_1 W_2 W_3 W_4 \ldots W_T)$ are replaced with the word classes to which the words belong.

Figure 3:
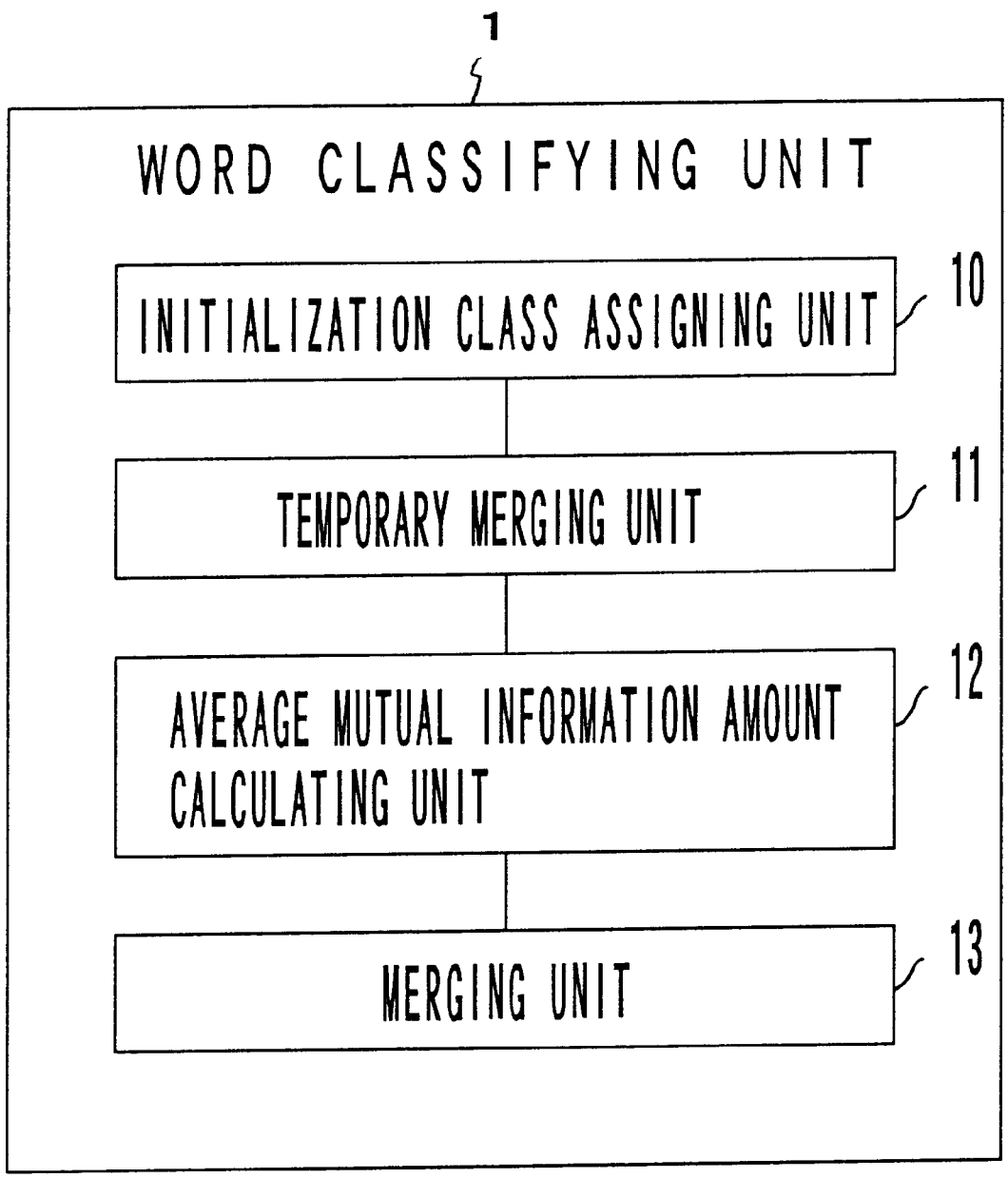
FIG. 3 shows a functional block diagram of a word classifying unit shown in FIG. 1.

FIG. 3 exemplifies a functional block diagram of the word classifying unit 1 shown in FIG. 1.

In this figure, an initialization class assigning unit 10 extracts different words from a one-dimensional sequence of words $(W_1 W_2 W_3 W_4 \ldots W_T)$ in text data, and assigns each of specific word classes $\{C_1, C_2, C_3, C_4, \ldots, C_V\}$ to each of the words $\{V_1, V_2, V_3, V_4, \ldots, V_V\}$ with a predetermined frequency of appearances.

A temporary merging unit 11 extracts two word classes $\{C_i, C_j\}$ from the set of word classes $\{C_1, C_2, C_3, C_4, \ldots, C_M\}$, and merges them temporarily.

An average mutual information amount calculating unit 12 calculates the average mutual information AMI of the word classes of text data $\{C_1, C_2, C_3, C_4, \ldots, C_{M-1}\}$, for which temporary merging is performed, according to the equation (1). Since there are "M(M−1)/2" combinations made by extracting two word classes $\{C_i, C_j\}$ from the set of "M" word classes $\{C_1, C_2, C_3, C_4, \ldots, C_M\}$ in this case, the average mutual information AMI of the "M(M−1)/2" combinations must be calculated.

A merging unit 13 extracts two word classes $\{C_i, C_j\}$, which maximize the average mutual information AMI, from the set of word classes $\{C_1, C_2, C_3, C_4, \ldots, C_M\}$, based on the calculated average mutual information AMI of the temporarily-merged "M(M−1)/2" combinations, and actually merges the extracted word classes. With this operation, a word belonging to either of the two word classes $\{C_i, C_j\}$, is classified as an identical word class.

The word class sequence generating unit 2 shown in FIG. 1 generates a word class sequence of text data by replacing each of the words structuring the one-dimensional sequence of words $(W_1 W_2 W_3 W_4 \ldots W_T)$ of the text data with each of the word classes $\{C_1, C_2, C_3, C_4, \ldots, C_V\}$.

FIG. 4 exemplifies a one-dimensional sequence of word classes of text data.

In this figure, assume that "C" word classes $\{C_1, C_2, C_3, C_4, \ldots, C_C\}$ are generated by the word classifying unit 1, words as a vocabulary $\{v_1, v_{37}, \ldots\}$ belong to a word class $C_1$, words as a vocabulary $\{v_3, v_{15}, \ldots\}$ belong to a word class $C_2$, words as a vocabulary $\{v_2, v_4, \ldots\}$ belong to a word class $C_3$, words as a vocabulary $\{v_7, v_9, \ldots\}$ belong to a word class $C_4$, words as a vocabulary $\{V_6, V_8, V_{26}, V_v, \ldots\}$ belong to a word class $C_5$, words as a vocabulary $\{V_6, V_{23}, \ldots\}$ belong to a word class $C_6$, and words as a vocabulary $\{V_5, V_{10}, \ldots\}$ belong to a word class $C_7$.

Also assume that a word as a vocabulary indicated by the word $W_1$ is $V_{15}$, a word as a vocabulary indicated by the word $W_2$ is $V_2$, a word as vocabulary indicated by the word $W_3$ is $V_{23}$, a word as a vocabulary indicated by the word $W_4$ is $V_4$, a word as a vocabulary indicated by the word $W_5$ is $V_5$, a word as a vocabulary indicated by the word $W_6$ is $V_{15}$, a word as a vocabulary indicated by the word $W_7$ is $V_5$, a word as a vocabulary indicated by the word $W_8$ is $V_{26}$, a word as a vocabulary indicated by the word $W_9$ is $V_{37}$, a word as a vocabulary indicated by the word $W_{10}$ is $V_2$, and a word as a vocabulary indicated by the word $W_T$ is $V_8$, in the one-dimensional sequence of words $(W_1 W_2 W_3 W_4 \ldots W_T)$ in the text data.

Since the vocabularies $V_{15}, V_2, V_{23}, V_4, V_5, V_{15}, V_5, V_{26}, V_{37}, V_2, \ldots$ and $V_8$ belong to the respective word classes $C_2, C_3, C_6, C_3, C_7, C_2, C_7, C_5, C_1, C_3, \ldots, C_5$, the words $W_1, W_2, W_3, W_4, W_5, W_6, W_7, W_8, W_9, W_{10}, \ldots, W_T$ are mapped to the respective word classes $C_2, C_3, C_6, C_3, C_7, C_2, C_7, C_5, C_1, C_3, \ldots, C_5$.

That is, the one-dimensional sequence of the word classes $(C_2 C_3 C_6 C_3 C_7 C_2 C_7 C_5 C_1 C_3 \ldots C_5)$ of the text data is generated in a one-to-one correspondence, as the result of mapping the one-dimensional sequence of the words $(W_1 W_2 W_3 W_4 \ldots W_T)$ in the text data by the "C" word classes $\{C_1, C_2, C_3, C_4, \ldots, C_C\}$.

The word class sequence extracting unit 3 shown in FIG. 1 extracts a word class sequence in which all of the degrees of stickiness between word classes in a one-dimensional sequence of word classes of text data are equal to or more than a predetermined value, from the one-dimensional sequence of the word classes of the text data. Here, the degree of stickiness between word classes is an index indicating the degree of intensity of a link between word classes structuring a word class sequence. As an indicator of the degree of stickiness, an amount of mutual information MI, correlation coefficient, cosine measure, likelihood ratio, etc., for example, are used.

Provided below is the explanation about the case in which a word class sequence is extracted from a one-dimensional sequence of word classes of text data, by using the amount of mutual information MI as the indicator of the degree of stickiness between word classes.

FIG. 5 exemplifies a word class sequence extracted by the word class sequence extracting unit 3.

In this figure, a one-dimensional sequence of word classes ($C_2$ $C_3$ $C_6$ $C_3$ $C_7$ $C_2$ $C_7$ . . . $C_5$) of text data is assumed to be generated in one-to-one correspondence as the result of mapping the word classes to a one-dimensional sequence of words ($W_1$ $W_2$ $W_3$ $W_4$ $W_5$ $W_6$ $W_7$ . . . $W_T$) in the text data. Two contiguous word classes ($C_i$, $C_j$) are sequentially extracted from the one-dimensional sequence of the word classes ($C_2$ $C_3$ $C_6$ $C_3$ $C_7$ $C_2$ $C_7$ . . . $C_5$) of the text data, and the amount of mutual information MI ($C_i$, $C_j$) between the two contiguous word classes ($C_i$, $C_j$) is calculated according to the following equation (2).

$$MI(C_i, C_j) = \log \{Pr(C_i, C_j)/(Pr(C_i)Pr(C_j))\} \quad (2)$$

If the amount of mutual information MI between the two contiguous word classes ($C_i$, $C_j$) is equal to or more than a predetermined threshold value TH, these two word classes are associated with each other by being linked with a class chain.

In FIG. 5, for example, the amount of mutual information $MI(C_2, C_3)$ between two contiguous word classes ($C_2$, $C_3$), the amount of mutual information MI ($C_3$, $C_6$) between two contiguous word classes ($C_3$, $C_6$), the amount of mutual information $MI(C_6, C_3)$ between two contiguous word classes ($C_6$, $C_3$), the amount of mutual information $MI(C_3, C_7)$ between two contiguous word classes ($C_3$, $C_7$), the amount of mutual information $MI(C_7, C_2)$ between two contiguous word classes ($C_7$, $C_2$), and the amount of mutual information $MI(C_2, C_7)$ between two contiguous word classes ($C_2$, $C_7$), . . . are sequentially calculated according to the equation (2).

If the amounts of mutual information $MI(C_2, C_3)$, $MI(C_3, C_7)$, $MI(C_7, C_2)$, . . . are equal to or more than the threshold value TH, and if the amounts of information $MI(C_3, C_6)$, $MI(C_6, C_3)$, $MI(C_2, C_7)$ are smaller than the threshold value TH, word class sequences $C_2$-$C_3$, $C_3$-$C_7$-$C_2$, . . . are extracted by linking the contiguous two word classes ($C_2$, $C_3$), ($C_3$, $C_7$), ($C_7$, $C_2$) with class chains.

Figure 6:
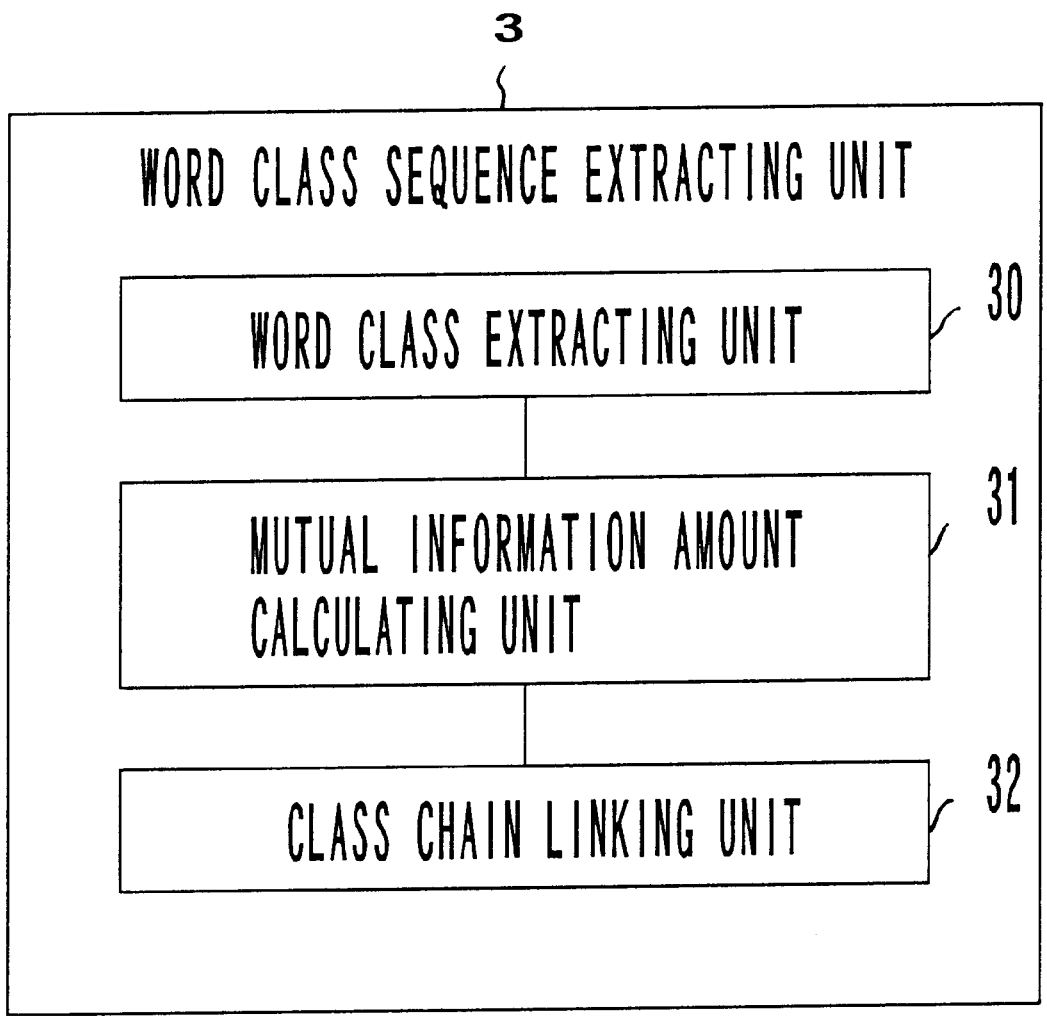
FIG. 6 shows a functional block diagram of a word class sequence extracting unit shown in FIG. 1.

FIG. 6 exemplifies a functional block diagram of the word class sequence extracting unit 3 shown in FIG. 1.

In this figure, a word class extracting unit 30 extracts two contiguous word classes ($C_i$, $C_j$) from a one-dimensional sequence of word classes of the text data.

A mutual information amount calculating unit 31 calculates the amount of mutual information $MI(C_i, C_j)$ between the two word classes ($C_i$, $C_j$) extracted by the word class extracting unit 30, according to the equation (2).

A class chain linking unit 32 links two word classes ($C_i$, $C_j$) whose amount of mutual information $MI(C_i, C_j)$ is equal to or more than a predetermined threshold value.

The token attaching unit 4 shown in FIG. 1 attaches a token to a word class sequence linked with a class chain by the word class sequence extracting unit 3.

FIG. 7 exemplifies a token attached by the token attaching unit 4.

Assume that word class sequences linked with class chains are $C_1$-$C_3$, $C_1$-$C_7$, . . . , $C_2$-$C_3$, $C_2$-$C_{11}$, . . . , $C_{300}$-$C_{32}$, . . . , $C_1$-$C_3$-$C_{80}$, $C_1$-$C_4$-$C_5$, $C_3$-$C_7$-$C_2$, . . . , $C_1$-$C_9$-$C_{11}$-$C_{32}$, . . . in FIG. 7. In this case, tokens $t_1$, $t_2$, $t_3$, $t_4$, $t_5$, $t_6$, $t_7$, $t_8$, $t_9$, . . . are attached to the respective word class sequences $C_1$-$C_3$, $C_1$-$C_7$, $C_2$-$C_3$, $C_2$-$C_{11}$, $C_{300}$-$C_{32}$, $C_1$-$C_3$-$C_{80}$, $C_1$-$C_4$-$C_5$, $C_3$-$C_7$-$C_2$, $C_1$-$C_9$-$C_{11}$-$C_{32}$, . . . .

The word/token sequence generating unit 5 shown in FIG. 1 replaces a word sequence belonging to a word class sequence that the word class sequence extracting unit 3 extracts from a one-dimensional sequence of words ($W_1$ $W_2$ $W_3$ $W_4$ $W_5$ $W_6$ $W_7$ . . . $W_T$) in text data, with a token, in order to generate a one-dimensional sequence of words and tokens in the text data.

Figure 8:
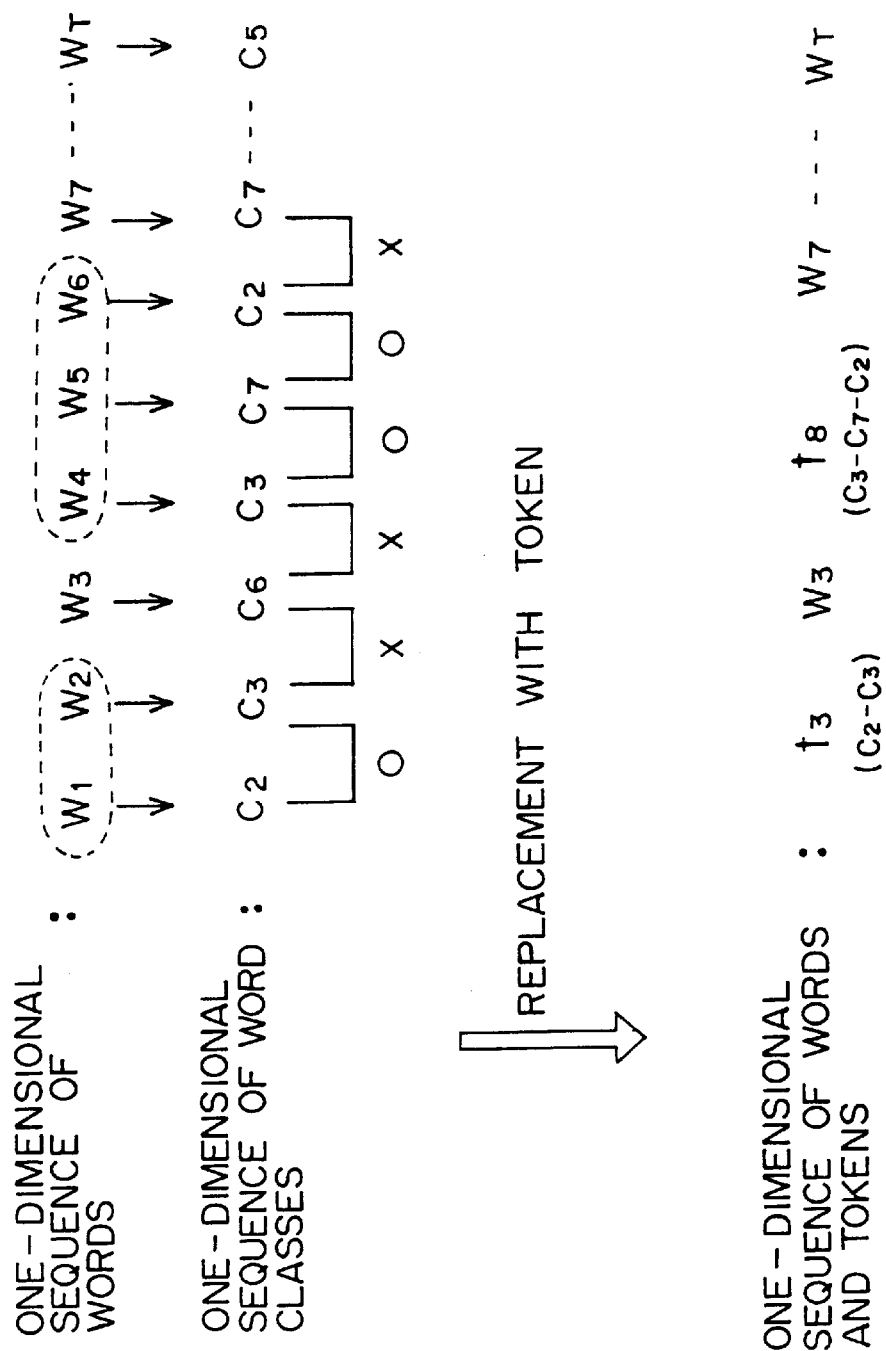
FIG. 8 is a schematic diagram showing a token replacement process performed by the word/phrase classification processing apparatus according to the embodiment of the present invention.

FIG. 8 exemplifies a one-dimensional sequence of words and tokens of text data.

In this figure, assume that a one-dimensional sequence of word classes ($C_2$ $C_3$ $C_6$ $C_3$ $C_7$ $C_2$ $C_7$ . . . $C_5$) of the text data is generated in a one-to-one correspondence, as the result of mapping the word classes to a one-dimensional sequence of words ($W_1$ $W_2$ $W_3$ $W_4$ $W_5$ $W_6$ $W_7$ . . . $W_T$) in the text data, and tokens $t_3$, $t_8$, . . . are attached to the word class sequences $C_2$-$C_3$, $C_3$-$C_7$-$C_2$, . . . linked with class chains, as shown in FIG. 7.

In this case, the word sequence ($W_1$ $W_2$) of text data belonging to the word class sequence $C_2$-$C_3$ linked with a class chain is replaced with the token $t_3$, and the word sequence ($W_4$ $W_5$ $W_6$) of the text data belonging to the word class sequence $C_3$-$C_7$-$C_2$ linked with a class chain is replaced with the token $t_8$, so that a one-dimensional sequence ($t_3$ $W_3$ $t_8$ $W_7$ . . . $W_T$) of words and tokens of the text data is generated.

Figure 9:
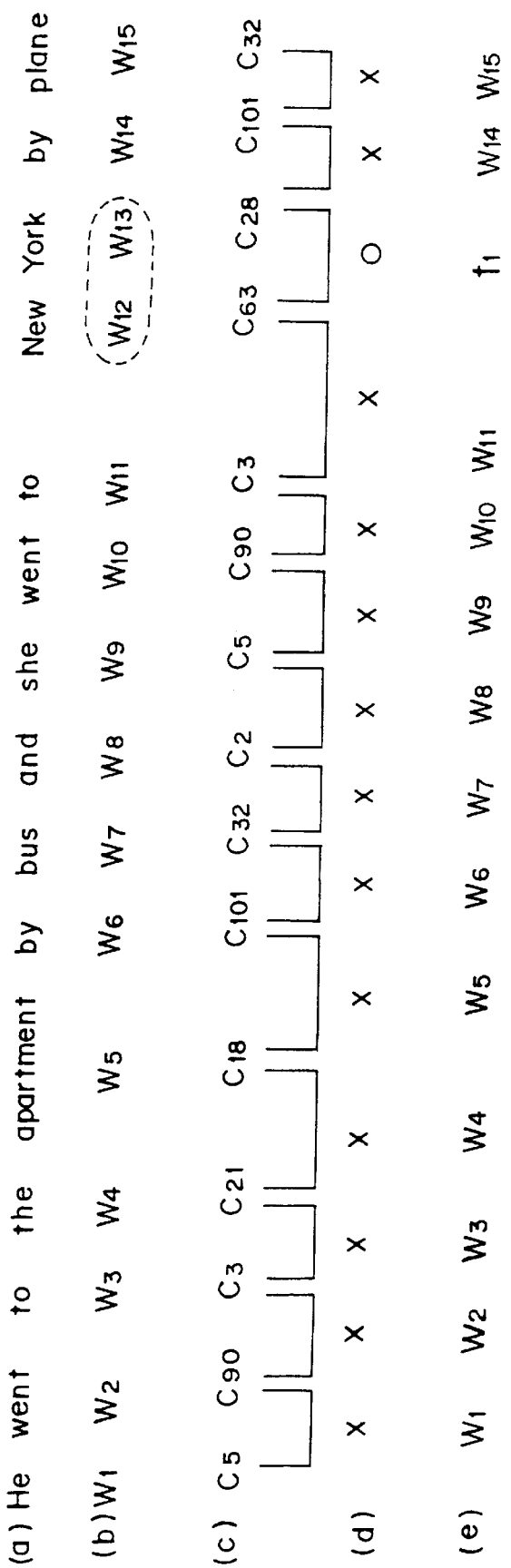
FIG. 9 exemplifies an English sentence used in the token replacement process performed by the word/phrase classification processing apparatus according to the embodiment of the present invention.

FIG. 9 exemplifies a one-dimensional sequence of words and tokens of English text data.

Assume that an English sentence "He went to the apartment by bus and she went to New York by plane." shown in FIG. 9(a) corresponds to a one-dimensional sequence of words of text data ($W_1$ $W_2$ $W_3$ $W_4$ $W_5$ $W_6$ $W_7$ $W_8$ $W_9$ $W_{10}$ $W_{11}$ $W_{12}$ $W_{13}$ $W_{14}$ $W_{15}$) shown in FIG. 9(b), and ($C_5$ $C_{90}$ $C_3$ $C_{21}$ $C_{18}$ $C_{101}$ $C_{32}$ $C_2$ $C_5$ $C_{90}$ $C_3$ $C_{63}$ $C_{28}$ $C_{101}$ $C_{32}$) shown in FIG. 9(c) is provided as a one-dimensional sequence of word classes, in a one-to-one correspondence to the above described one-dimensional sequence of words of text data.

As a result of calculating the amount of mutual information $MI(C_i, C_j)$ between two contiguous word classes ($C_i$, $C_j$), if the amount of mutual information $MI(C_{63}, C_{28})$ is equal to or more than a predetermined threshold value TH, and if the amounts of mutual information $MI(C_5, C_{90})$, $MI(C_{90}, C_3)$, $MI(C_3, C_{21})$, $MI(C_{21}, C_{18})$, $MI(C_{18}, C_{101})$, $MI(C_{101}, C_{32})$, $MI(C_{32}, C_2)$, $MI(C_2, C_5)$, $MI(C_5, C_{90})$, $MI(C_{90}, C_3)$, $MI(C_3, C_{63})$, $MI(C_{28}, C_{101})$, and $MI(C_{101}, C_{32})$ are less than the predetermined threshold value TH in the one-dimensional sequence of word classes ($C_5$ $C_{90}$ $C_3$ $C_{21}$ $C_{19}$ $C_{18}$ $C_{101}$ $C_{32}$ $C_2$ $C_5$ $C_{90}$ $C_3$ $C_{63}$ $C_{28}$ $C_{101}$ $C_{32}$), the two contiguous word classes ($C_{63}$, $C_{28}$) are linked with a class chain as shown in FIG. 9(d).

These two word classes ($C_{63}$, $C_{28}$) linked with the class chain are replaced with the token $t_1$, so that a one-dimensional sequence of words and a token ($W_1$ $W_2$ $W_3$ $W_4$ $W_5$ $W_6$ $W_7$ $W_8$ $W_9$ $W_{10}$ $W_{11}$ $t_1$ $W_{14}$ $W_{15}$) is generated as shown in FIG. 9(e).

The word/token classifying unit 6 shown in FIG. 1 generates "D" word/token classes $\{T_1, T_2, T_3, T_4, \ldots, T_D\}$ in which words and tokens exist together, by separating a set of "N" words $\{W_1, W_2, W_3, W_4, \ldots, W_N\}$, or a set of "L" tokens $\{t_1, t_2, t_3, t_4, \ldots, t_L\}$, of words and tokens in text data.

Since the word/token classifying unit 6 regards a word class sequence with a token attached as one word, and can equally handle the words $\{W_1, W_2, W_3, W_4, \ldots, W_N\}$ included in the text data and the tokens $\{t_1, t_2, t_3, t_4, \ldots, t_L\}$, it can perform a classification process without making a distinction between the words $\{W_1, W_2, W_3, W_4, \ldots, W_N\}$ and the tokens $\{t_1, t_2, t_3, t_4, \ldots, t_L\}$.

FIG. 10 shows a functional block diagram of the word/token classifying unit 6 shown in FIG. 1.

In this figure, an initialization class assigning unit 140 extracts different words and tokens from a word/token sequence of text data, and assigns specific word/token classes {$T_1, T_2, T_3, T_4, \ldots, T_Y$} to each of the "N" words {$W_1, W_2, W_3, W_4, \ldots, W_N$} having a predetermined frequency of appearances and each of the "L" tokens {$t_1, t_2, t_3, t_4, \ldots, t_L$}.

A temporary merging unit 141 extracts two word/token classes {$T_i, T_j$} from a set of word/token classes {$T_1, T_2, T_3, T_4, \ldots, T_M$}, and merges the extracted classes temporarily.

An average mutual information amount calculating unit 142 calculates average mutual information AMI of word/token classes {$T_1, T_2, T_3, T_4, \ldots, T_{M-1}$}, for which temporary merging is performed, according to the equation (1). Since there are "M(M−1)/2" combinations made by extracting two word/token classes {$T_i, T_j$} from the set of "M" word/token classes {$T_1, T_2, T_3, T_4, \ldots, T_M$} in this case, the average mutual information AMI of the "M(M−1)/2" combinations must be calculated.

A merging unit 143 extracts two word/token classes {$T_i, T_j$}, which maximize the average mutual information AMI, from the set of word/token classes {$T_1, T_2, T_3, T_4, \ldots, T_M$}, and actually merges the extracted two classes, based on the average mutual information AMI of the temporarily-merged "M(M−1)/2" combinations. With such a process, words and tokens belonging to any of the merged word/token classes {$T_i, T_j$}, are classified as identical word/token classes.

The phrase replacing unit 7 shown in FIG. 1 generates a phrase by inversely replacing a token in a word/token class with a word sequence replaced by the word/token sequence generating unit 5.

Figure 11:
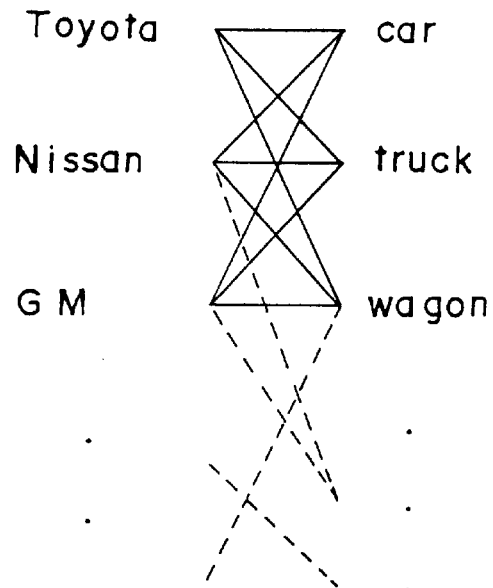
FIG. 11 is a schematic diagram showing a relationship between a token and a phrase according to the word/phrase classification processing apparatus according to the embodiment of the present invention.

FIG. 11 shows a relationship between a class chain and a phrase.

In FIG. 11, assume that word classes $C_{300}$ and $C_{32}$, for example, are linked with a class chain, and a token $t_5$ is attached to the word class sequence $C_{300}$-$C_{32}$ linked with the class chain. Also assume that "A" words such as "Toyota", "Nissan", "GM", etc. belong to the word class $C_{300}$, and "B" words such as "car", "truck", "wagon", etc. belong to the word class $C_{32}$.

In this case, phrase candidates such as "Toyota car", "Toyota truck", "Toyota wagon", "Nissan car", "Nissan truck", "Nissan wagon", "GM car", "GM truck", "GM wagon", etc. are generated by a resultant number of multiplications of the number "A" of words belonging to the word class $C_{300}$ by the number "B" of words belonging to the word class $C_{32}$. Because the phrase candidates may sometimes include a phrase which does not exist in text data, only phrases included in the text data are extracted by scanning the text data. Let it be supposed that the phrases "Nissan truck" and "Toyota wagon" are included in the text data, but the phrases "Toyota Car", "Toyota truck", "Nissan Car", "Nissan wagon", "GM car", "GM truck", and "GM wagon" are not included. In this case, only the phrases "Nissan truck" and "Toyota Wagon" are extracted as phrases from the text data, as shown in FIG. 11(C).

FIG. 12 exemplifies "C" word classes {$C_1, C_2, C_3, C_4, \ldots, C_C$}, "D" word/token classes {$T_1, T_2, T_3, T_4, \ldots, T_D$}, and "D" word/phrase classes {$R_1, R_2, R_3, R_4, \ldots, R_D$}.

Figure 12A:
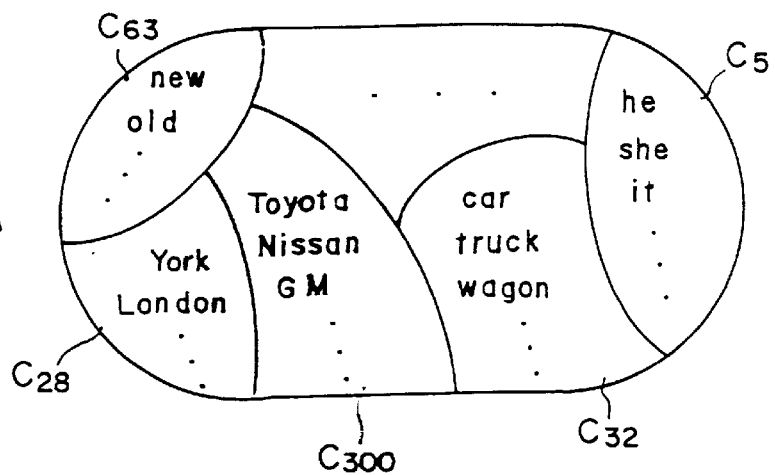
FIG. 12 is a schematic diagram showing a result of a word/phrase classification process performed by the word/phrase classification processing apparatus according to the embodiment of the present invention.

In FIG. 12A, assume that the "C" word classes {$C_1, C_2, C_3, C_4, \ldots, C_C$} are generated by the word classifying unit 1 shown in FIG. 1, words such as "he", "she", "it", etc. belong to the word class $C_5$, words such as "York", "London", etc. belong to the word class $C_{28}$, words such as "car", "truck", "wagon", etc. belong to the word class $C_{32}$, words such as "New", "old", etc. belong to the word class $C_{63}$, and words such as "Toyota", "Nissan", "GM", etc. belong to the word class $C_{300}$. Also assume that text data includes the phrases such as "New York", "Nissan truck", and "Toyota wagon" repeatedly appear in the text data.

The word class sequence extracting unit 3 shown in FIG. 1 determines that the degree of stickiness between the word class $C_{63}$ to which "New" belongs and the word class $C_{28}$ to which "York" belongs, is large in the one-dimensional sequence of the word classes {$C_1, C_2, C_3, C_4, \ldots, C_C$} mapped to the one-dimensional sequence of words in the text data ($W_1$ $W_2$ $W_3$ $W_4$ $\ldots$ $W_T$) in a one-to-one correspondence, and links the word classes $C_{63}$ and $C_{28}$ using a class chain. Furthermore, the word class sequence extracting unit 3 determines that the degree of stickiness between the word class $C_{300}$ to which "Toyota" and "Nissan" belong and the word class $C_{32}$ to which "truck" and "wagon" belong is large, and links these word classes $C_{300}$ and $C_{32}$ with a class chain.

The token attaching unit 4 attaches a token $t_1$ to the word class sequence $C_{63}$-$C_{28}$, and attaches a token $t_5$ to the word class sequence $C_{300}$-$C_{32}$.

The word/token sequence generating unit 5 replaces "New York" included in the one-dimensional sequence of words ($W_1$ $W_2$ $W_3$ $W_4$ $\ldots$ $W_T$) in the text data with the token $t_1$, and replaces "Nissan truck" and "Toyota wagon" included in the one-dimensional sequence of words ($W_1$ $W_2$ $W_3$ $W_4$ $\ldots$ $W_T$) in the text data with the token $t_5$, and generates a one-dimensional sequence of the words and tokens.

Figure 12B:
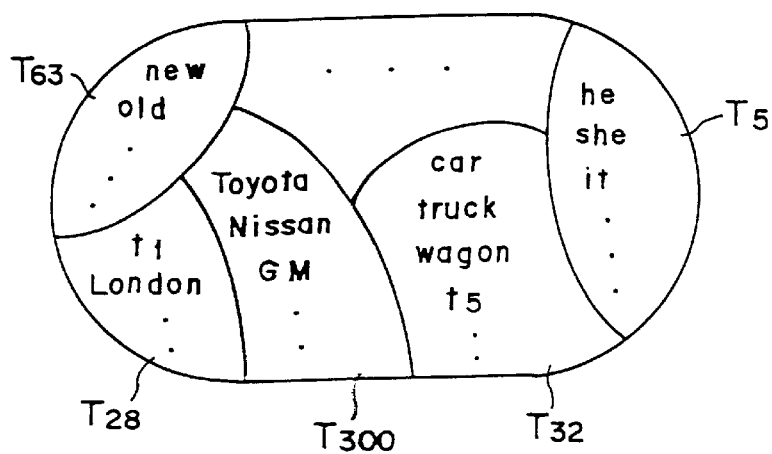

The word/token classifying unit 6 classifies both the words such as "he", "she", "it", "London", "car", "truck", "wagon", etc. included in the one-dimensional sequence of the words and tokens, and the tokens such as "$t_1$", "$t_5$", etc., included in the one-dimensional sequence of the words and tokens, and generates "D" word/token classes {$T_1, T_2, T_3, T_4, \ldots, T_D$} shown in FIG. 12B.

In the word/token classes {$T_1, T_2, T_3, T_4, \ldots, T_D$}, for example, the words such as "he", "she", "it", etc. and a corresponding token belong to the word/token class $T_5$, the words such as "London", etc. and a corresponding token belong to the word/token class $T_{28}$, the words such as "car", "truck", "wagon", and a corresponding token belong to the word/token class $T_{32}$, the words such as "New", "old", etc. and a corresponding token belong to the word/token class $T_{63}$, and the words such as "Toyota", "Nissan", "GM", etc. and a corresponding token belong to the word/token class $T_{300}$. As described above, the word/token classes {$T_1, T_2, T_3, T_4, \ldots, T_D$} include words and tokens together without making a distinction.

Figure 12C:
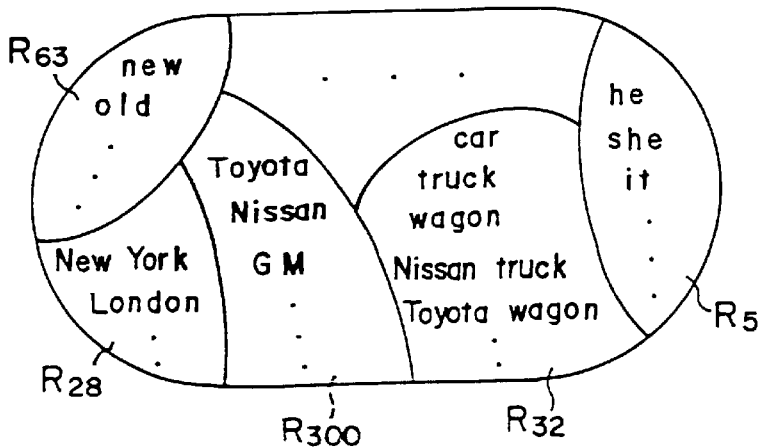

The phrase replacing unit 7 inversely replaces each of the tokens such as "$t_1$", "$t_5$", etc. included in the word/token classes {$T_1, T_2, T_3, T_4, \ldots, T_D$} shown in FIG. 12(b) with a phrase included in the one-dimensional sequence of words in the text data, in order to generate the word/phrase classes {$R_1, R_2, R_3, R_4, \ldots, R_D$} shown in FIG. 12C. For example, the word/token sequence generating unit 5 replaces "New York" included in the one-dimensional sequence of words in the text data with the token $t_1$ belonging to the word/token class $T_{28}$. Therefore, the token $t_1$ is inversely replaced with "New York" to generate a word/phrase class $R_{28}$. Additionally, the word/token sequence generating unit 5 replaces "Nissan truck" and "Toyota wagon" included in the one-dimensional sequence of words in the text data with the token $t_5$ belonging to the word/token class $T_{32}$. Therefore, the token $t_5$ is inversely replaced with "Nissan truck" and "Toyota wagon" to generate a word/phrase class $R_{32}$.

FIG. 13 is a block diagram showing the configuration of the word/phrase classification processing apparatus shown in FIG. 1.

In this figure, memory interfaces 42 and 46, a CPU 43, a ROM 44, a working RAM 45, and a RAM 47 included in a word/phrase classifying unit 41 are connected via a bus 48. If text data 40 is input to the word/phrase classifying unit 41, the CPU 43 processes the text data 40 according to a program stored in the ROM 44, and classifies word and phrase included in the text data 40. The result of classifying the word and phrase included in the text data 40 is stored in a word/phrase dictionary 49.

Figure 14:
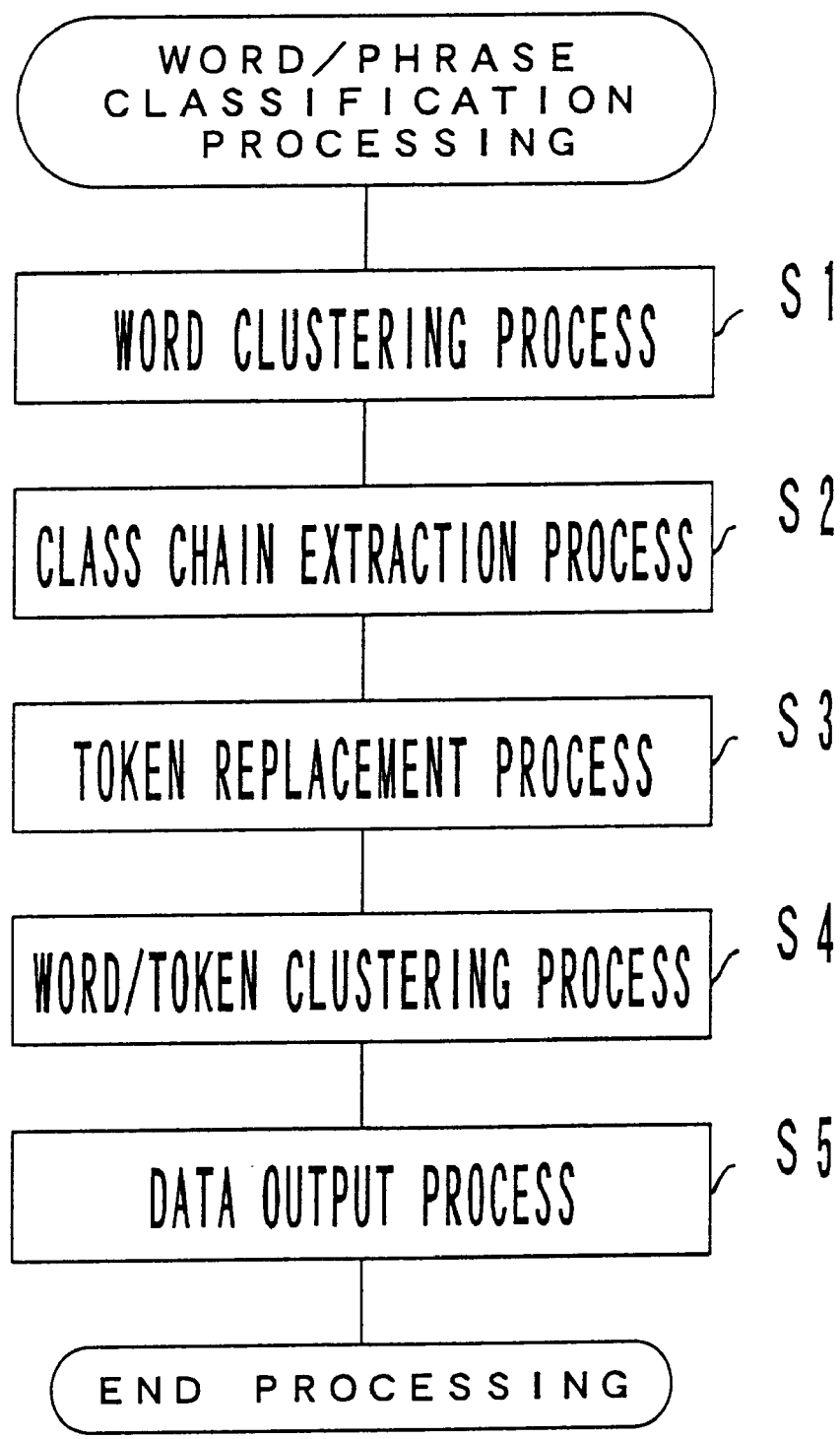
FIG. 14 is a flowchart showing the word/phrase classification process performed by the word/phrase classification processing apparatus according to the embodiment of the present invention.

FIG. 14 is a flowchart showing operations performed by the word/phrase classification processing apparatus shown in FIG. 1.

In this figure, a word clustering process is performed in step S1. The word clustering process extracts "V" different words $\{V_1, V_2, V_3, V_4, \ldots, V_V\}$, from text data as a one-dimensional sequence of words $(W_1\ W_2\ W_3\ W_4 \cdots W_T)$. Then, a first clustering process for separating a set of "V" words $\{V_1, V_2, V_3, V_4, \ldots, V_V\}$ into "C" word classes $\{C_1, C_2, C_3, C_4, \ldots, C_C\}$, is performed.

If a merging process is performed for the "V" word classes $\{C_1, C_2, C_3, C_4, \ldots, C_V\}$ to reduce the number of the "V" word classes one by one and generate the "C" word classes $\{C_1, C_2, C_3, C_4, \ldots, C_C\}$ after each of the word classes $\{C_1, C_2, C_3, C_4, \ldots, C_V\}$ is assigned to each of the "V" words $\{V_1, V_2, V_3, V_4, \ldots, V_V\}$, and if the "V" is a large number such as 7,000, the number of times of calculation of the average mutual information AMI based on the equation (1) becomes huge, which is not realistic. In such a case, a window process is performed to reduce the number of word classes for which the merging process is performed.

Figure 15:
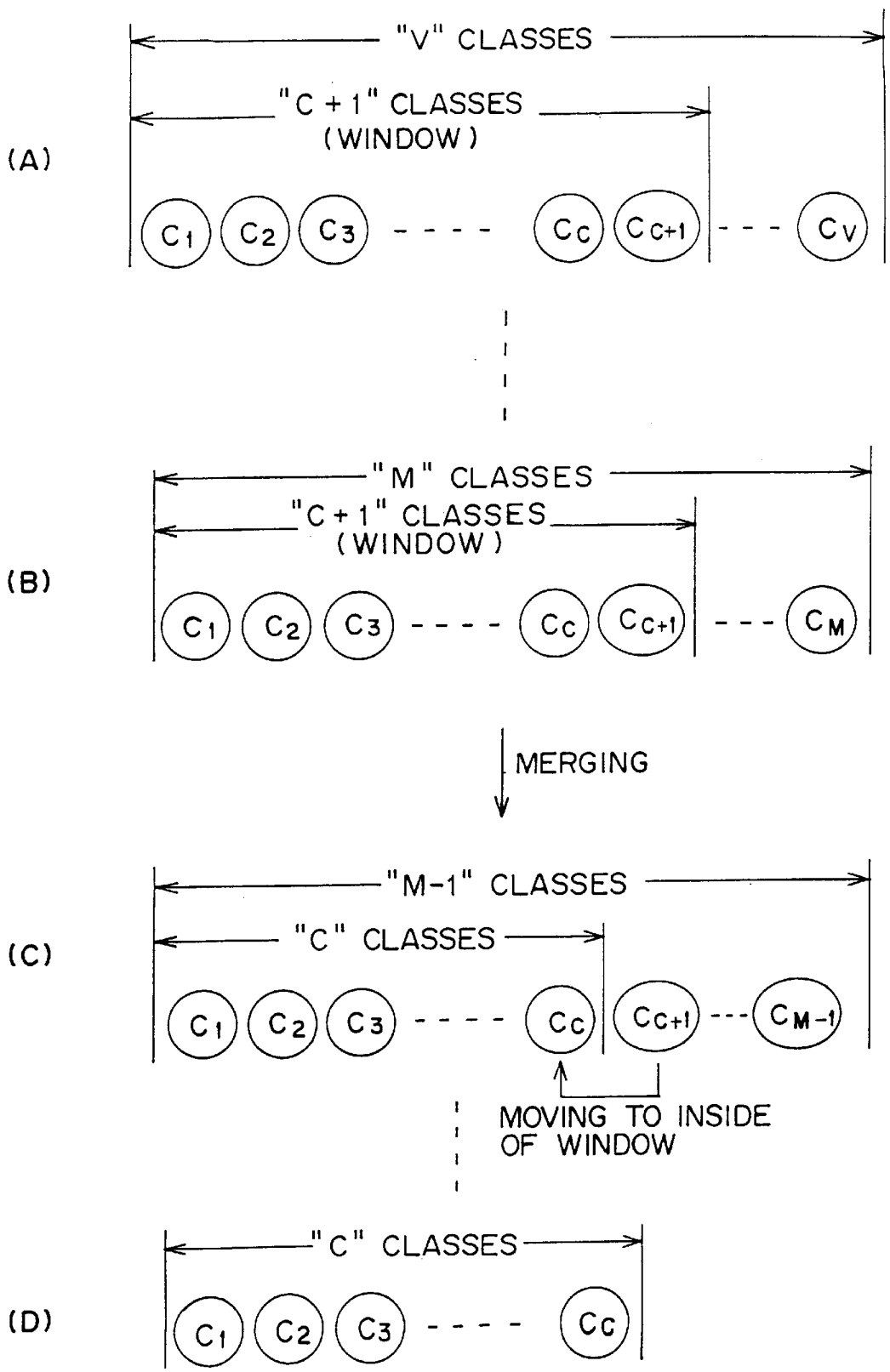
FIG. 15 is a schematic diagram showing a window process performed by the word/phrase classification processing apparatus according to the embodiment of the present invention.

FIG. 15 is a schematic diagram showing a window process.

In FIG. 15(A), "C+1" word classes $\{C_1, C_2, C_3, C_4, \ldots, C_C, C_{C+1}\}$ assigned to words with the high frequency of appearances in text data are extracted from "V" word classes $\{C_1, C_2, C_3, C_4, \ldots, C_V\}$ assigned to each of "V" words $\{V_1, V_2, V_3, V_4, \ldots, V_V\}$ in the text data, and the merging process is performed for the "C+1" word class $\{C_1, C_2, C_3, C_4, \ldots, C_C, C_{C+1}\}$.

If the merging process is performed for the "C+1" word classes $\{C_1, C_2, C_3, C_4, \ldots, C_C, C_{C+1}\}$ in a window as shown in FIG. 15(B), the number of "M" word classes $\{C_1, C_2, C_3, \ldots, C_M\}$ is reduced by one, and results in "M–1", that is, $\{C_1, C_2, C_3, C_4, \ldots, C_{M-1}\}$. At the same time, the number of the "C+1" word classes $\{C_1, C_2, C_3, C_4, \ldots, C_C, C_{C+1}\}$ is reduced by 1, and results in "C", that is, $\{C_1, C_2, C_3, C_4, \ldots, C_C\}$.

In this case, the word class $C_{C+1}$ whose frequency of appearances in the text data is the highest among the word classes $\{C_{C+1}, \ldots, C_{M-1}\}$ outside the window, is moved to the inside of the window, in order to keep the number of word classes inside the window constant, as shown in FIG. 15(C).

When there is not any window class left outside the window, and the "C" word classes $\{C_1, C_2, C_3, C_4, \ldots C_C\}$ shown in FIG. 15(d) are generated, and the word clustering process is terminated.

The number of word classes inside the window is set as "C+1" in the above described embodiment. However, that number may be less than "V" except for "C+1", or may vary in the course of the process.

Figure 16:
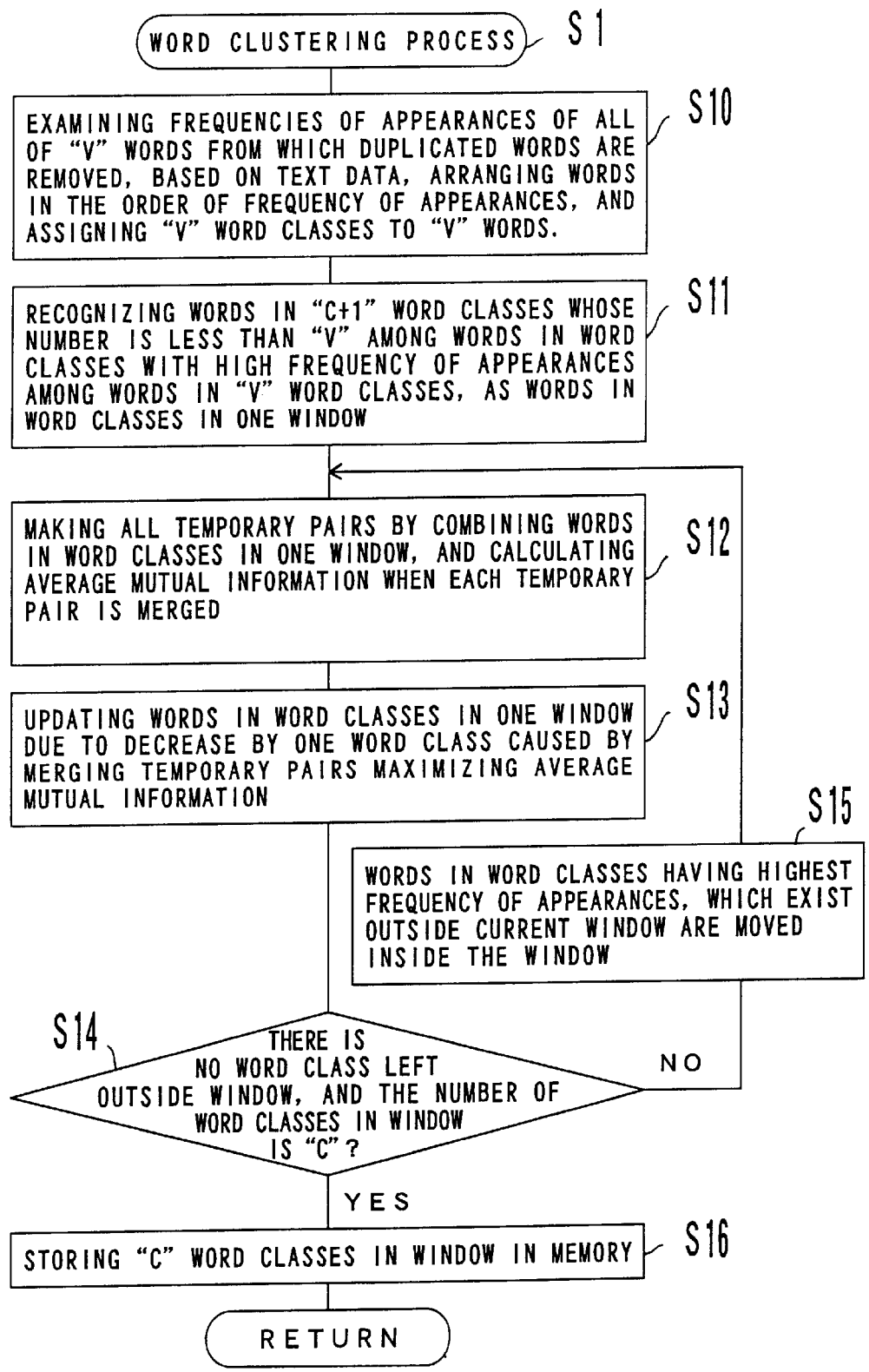
FIG. 16 is a flowchart showing a word clustering process performed by the word/phrase classification processing apparatus according to the embodiment of the present invention.

FIG. 16 is a flowchart showing the word clustering process performed in step S1 shown in FIG. 14.

In this figure, after the frequencies of appearances of all of the "V" words $\{V_1, V_2, V_3, V_4, \ldots, V_V\}$ from which duplicated words are removed, are examined based on the text data as the one-dimensional sequence of "T" words $(W_1\ W_2\ W_3\ W_4 \ldots W_T)$, the "V" words $\{V_1, V_2, V_3, V_4, \ldots, V_V\}$ are arranged in descending order of the frequency of appearances. Then, each of the "V" words $\{V_1, V_2, V_3, V_4, \ldots, V_V\}$ is assigned to the "V" word classes $\{C_1, C_2, C_3, C_4, \ldots, C_V\}$, as shown in step S10.

Next, words in the "C+1" word classes whose number is less than "V" among the words with a high frequency of appearances included in the words in the "V" word classes $\{C_1, C_2, C_3, C_4, \ldots, C_V\}$, are recognized as words included in word classes in one window, in step S11.

Then, all of the temporary pairs are made by combining the words included in the word classes in one window, and the average mutual information AMI are calculated according to the equation (1) after the temporary pairs are merged, in step S12.

The number of the word classes is then reduced by one, by merging temporary pairs which maximize the average mutual information AMI, and the words in the actually-merged word classes in one window are updated, in step S13.

Next, in step S14, it is determined whether or not there is no word class outside the window, and whether or not the number of word classes inside the window becomes "C". If this condition is not satisfied, the process goes to step S15 in which the words in the word class having the highest frequency of appearances are moved to the inside of the window. Then, the process goes back to step S12 to repeat the above described operations, so that the number of word classes is reduced.

If the condition in step S14 is satisfied, that is, if there is no word class left outside the window and the number of word classes becomes "C", the process goes to step S16 to store the "C" word classes $\{C_1, C_2, C_3, C_4, \ldots, C_C\}$ in the window in a memory.

Then, a class chain extracting process is performed as shown in step S2 in FIG. 14.

The class chain extracting process extracts a set of word class sequences linked with chains, by linking two contiguous word classes having the amount of mutual information which is equal to or more than a predetermined threshold value using a chain, in a generated one-dimensional sequence of word classes of text data based on the first clustering process performed in step S1.

Figure 17:
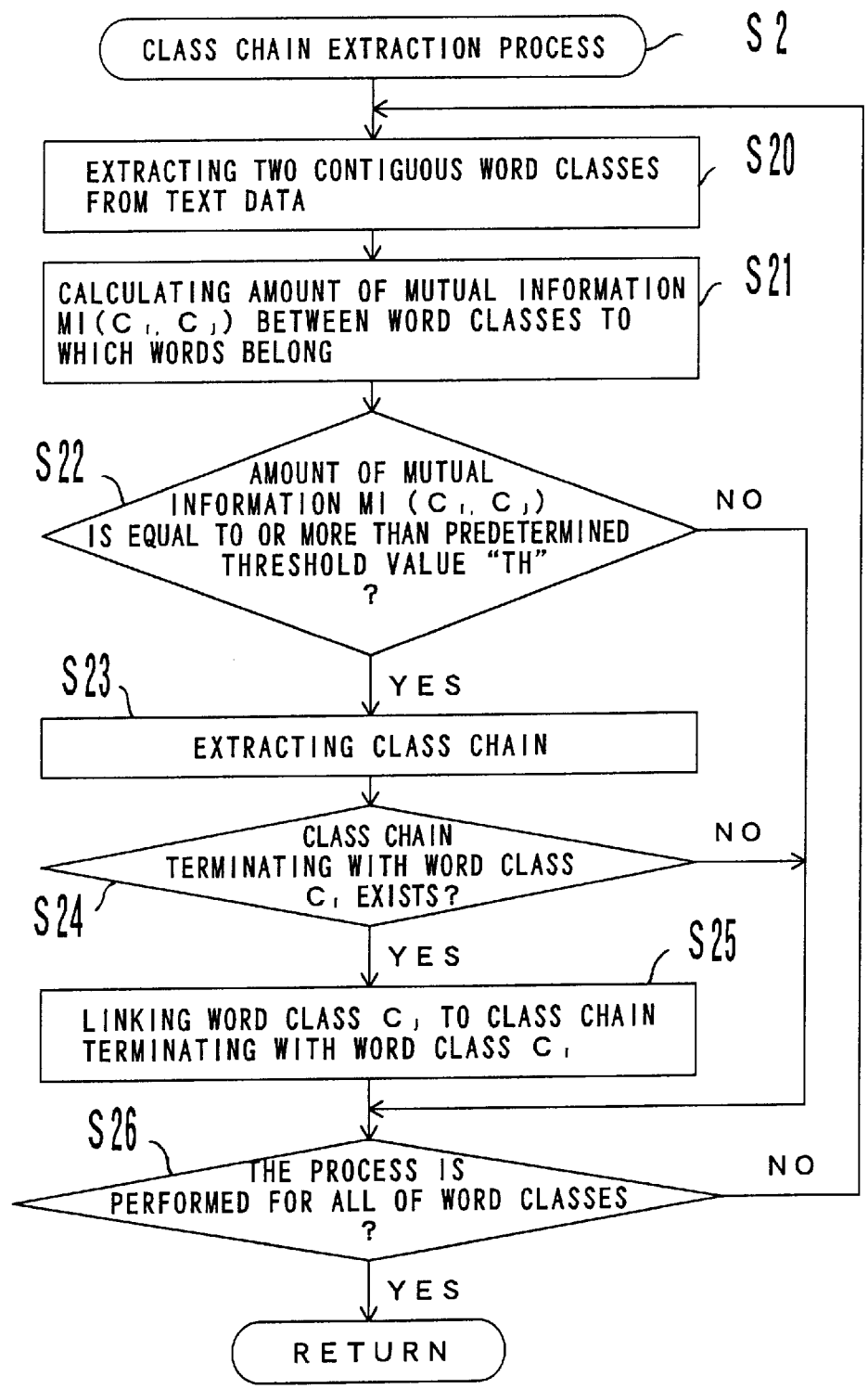
FIG. 17 is a flowchart showing a first embodiment of the class chain extraction process performed by the word/phrase classification processing apparatus according to the present invention.

FIG. 17 is a flowchart showing a first embodiment of the class chain extracting process performed in step S2.

In this figure, two contiguous word classes $(C_i, C_j)$ are extracted from a one-dimensional sequence of word classes of text data, as shown in step S20.

Then, the amount of mutual information $MI(C_i, C_j)$ between the two word classes $(C_i, C_j)$ extracted in step S20 is calculated according to the equation (2), in step S21.

Next, it is determined whether or not the amount of mutual information $MI(C_i, C_j)$ calculated in step S21 is equal to or more than a predetermined threshold value TH in step S22. If the amount of mutual information $MI(C_i, C_j)$ is equal to or more than the predetermined threshold value TH, the process goes to step S23 to link the two word classes $(C_i, C_j)$ extracted in step S20 using a class chain, and store them in a memory. If the amount of mutual information $MI(C_i, C_j)$ is less than the predetermined threshold value TH, the process goes to step S26.

Then, it is determined whether or not a class chain terminating with the word class $C_i$ exists in the word classes linked with the class chain stored in the memory in step S24. If it exists, the process goes to step S25 to link the word class $C_j$ to the class chain terminating with the word class $C_i$.

If no class chain terminating with the word class $C_i$ exists in step S24, the process goes to step S26.

Next, it is determined whether or not all of the two contiguous word classes $(C_i, C_j)$ are extracted from the one-dimensional sequence of word classes of the text data in step S26. If "YES", the class chain extracting process is terminated. If "NO", the process goes back to step S20 to repeat the above described operations.

Figure 18:
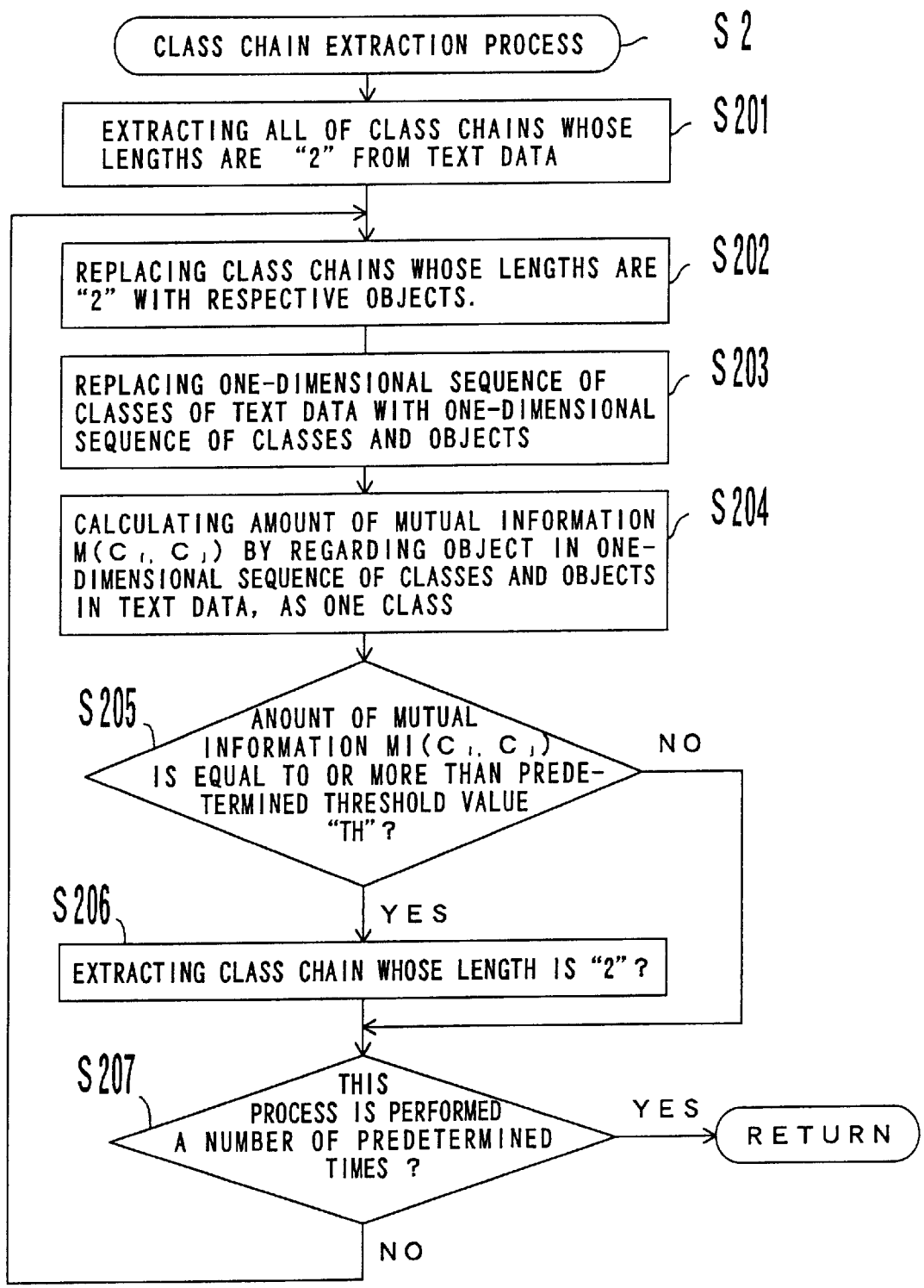
FIG. 18 is a flowchart showing a second embodiment of the class chain extraction process performed by the word/phrase classification processing apparatus according to the present invention.

FIG. 18 is a flowchart showing a second embodiment of the class chain extraction process performed in step S2.

In step S201 in this figure, two contiguous word classes ($C_i$, $C_j$) are sequentially extracted from the one-dimensional sequence of word classes of text data, and all of the class chains whose length is "2" are extracted from the one-dimensional sequence of word classes of the text data, by calculating the amount of mutual information $MI(C_i, C_j)$ between the two extracted word classes ($C_i$, $C_j$).

Next, all of the class chains whose length is "2" are replaced with respective objects in step S202. Here, an object functions in the same way as the above described token. A token attached to a class chain whose length is "2" is specifically called an object.

Then, each of the class chains whose length is "2" in the one-dimensional sequence of word classes of the text data, to which the object is attached in step S202, is replaced with an object, so that a one-dimensional sequence of word classes and objects of the text data is generated in step S203.

One object existing in the one-dimensional sequence of word classes and objects of the text data is regarded as one class, and the amount of mutual information $MI(C_i, C_j)$ between the two classes ($C_i$, $C_j$), is calculated according to the equation (2), in step S204. That is, the amount of mutual information $MI(C_i, C_j)$ in the one-dimensional sequence of word classes and objects of the text data is calculated between two contiguous classes, between contiguous class and object (class chain whose length is "2"), or between two contiguous objects (class chains whose lengths are "2").

Then, it is determined whether or not the amount of mutual information $MI(C_i, C_j)$ calculated in step S204 is equal to or more than a predetermined threshold value TH in step S205. If "YES", the process goes to step S206 to link the two contiguous word classes extracted in step S204, contiguous word class and object, or two contiguous objects using a class chain. If the amount of mutual information $MI(C_i, C_j)$ is less than the predetermined threshold value TH, the process skips step S206.

Figure 19:
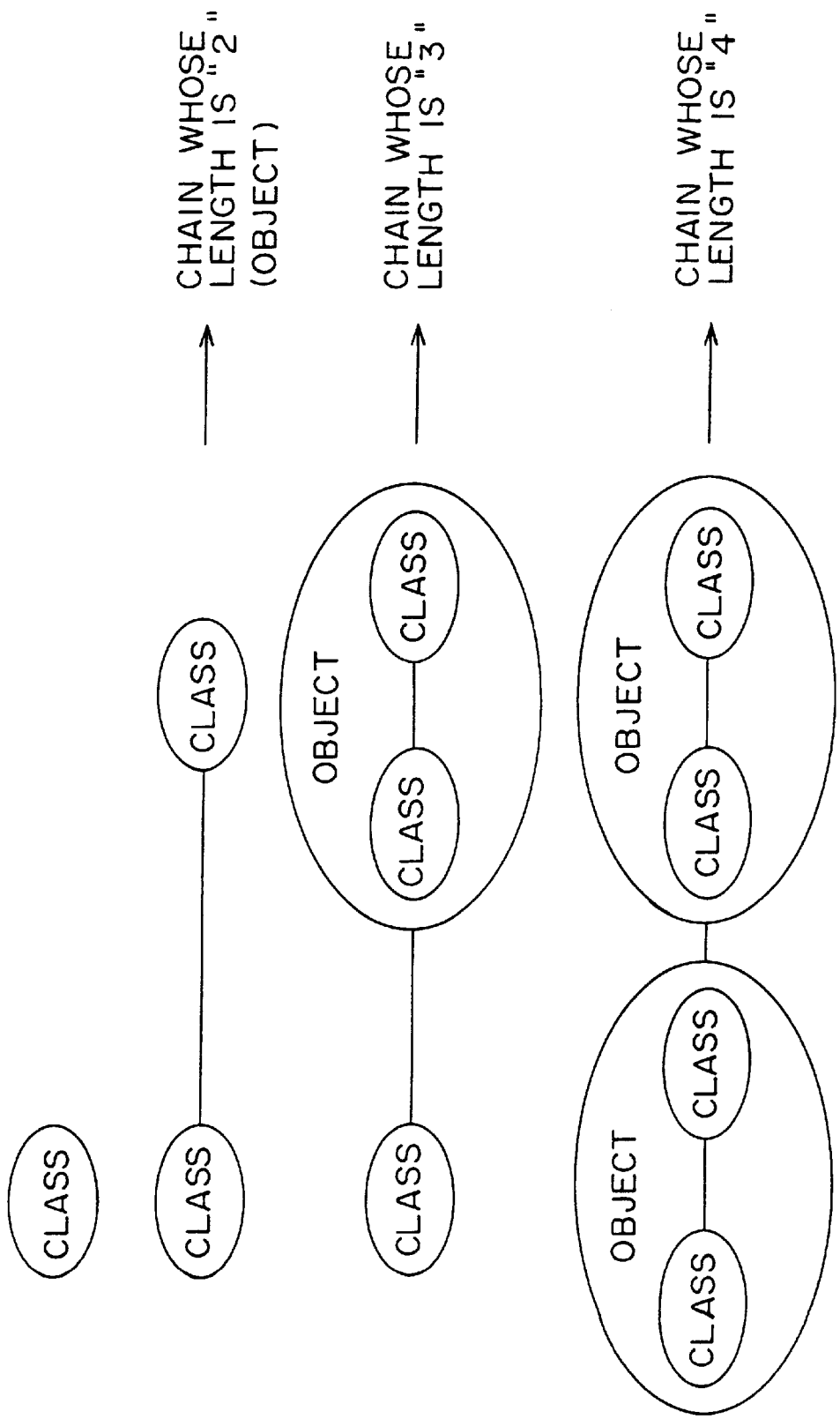
FIG. 19 is a schematic diagram showing a second embodiment of the class chain extraction process performed by the word/phrase classification processing apparatus according to the present invention.

FIG. 19 shows class chains extracted from a one-dimensional sequence of word classes and objects of the text data.

If a class chain is extracted from between two contiguous classes, a class chain whose length is "2" (object) is generated. If a class chain is extracted from between a contiguous class and object, a class chain whose length is "3" is generated. If a class chain is extracted from between two contiguous objects, a class chain whose length is "4" is generated.

Then, it is determined whether or not the class chain extraction process is performed a predetermined number of times in step S207 in FIG. 18. If "NO", the process goes back to step S202 to repeat the above described operations.

As described above, a class chain having an arbitrary length can be extracted by repeating operations such as replacing a class chain whose length is "2" with an object, and calculating the amount of mutual information $MI(C_i, C_j)$.

Then, a token replacement process is performed as shown in step S3 of FIG. 14. With this token replacement process, a one-dimensional sequence of words and tokens of text data is generated by corresponding a specific token to a word class sequence extracted by the class chain extraction process in step S2, searching a word sequence belonging to that word class sequence for a one-dimensional sequence of words in text data, and replacing a corresponding word sequence in the text data with a token.

Figure 20:
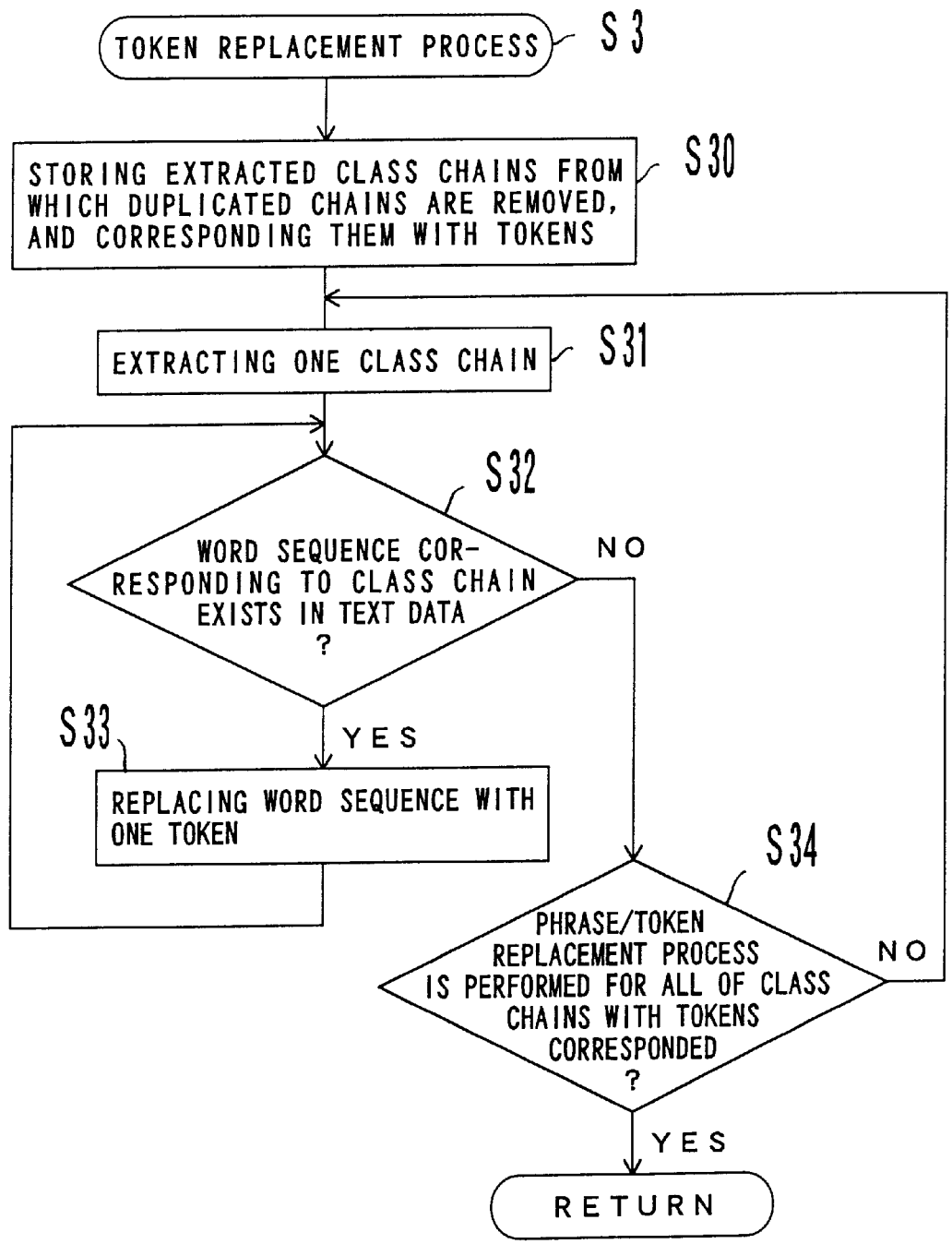
FIG. 20 is a flowchart showing the token replacement process performed by the word/phrase classification processing apparatus according to the embodiment of the present invention.

FIG. 20 is a flowchart showing the token replacement process performed in step S3.

In this figure, extracted class chains from which duplicated chains are removed are sorted according to a predetermined rule, and a token is corresponded to each of the sorted class chains, and a name is given to each of the chains, in step S30. The sorting of the class chains is performed, for example, in the order of ASCII code.

Then, one class chain corresponded with a token is extracted in step S31.

In step S32, it is determined whether or not a word sequence belonging to word class sequences linked with a class chain exists in a one-dimensional sequence of words in the text data. If "YES", the process goes to step S33 to replace the corresponding word sequence in the text data with one token. The above described process is repeated until there is no word sequence belonging to the word class sequences linked with the class chain, left in the one-dimensional sequence of words in the text data.

If "NO", the process goes to step S34 to determine whether or not the phrase token replacement process is performed for all of the class chains corresponded with tokens in step S30. If "NO", the process goes back to step S31 to extract another class chain. The above described operations are then repeated.

Then, a word/token clustering process is performed as shown in step S4 in FIG. 14. With this word/token clustering process, different words and tokens are extracted from a one-dimensional sequence of words and tokens of text data. Then, a second clustering process for separating a set including words and tokens into word/token classes $\{T_1, T_2, T_3, T_4, \ldots, T_D\}$, is performed.

Figure 21:
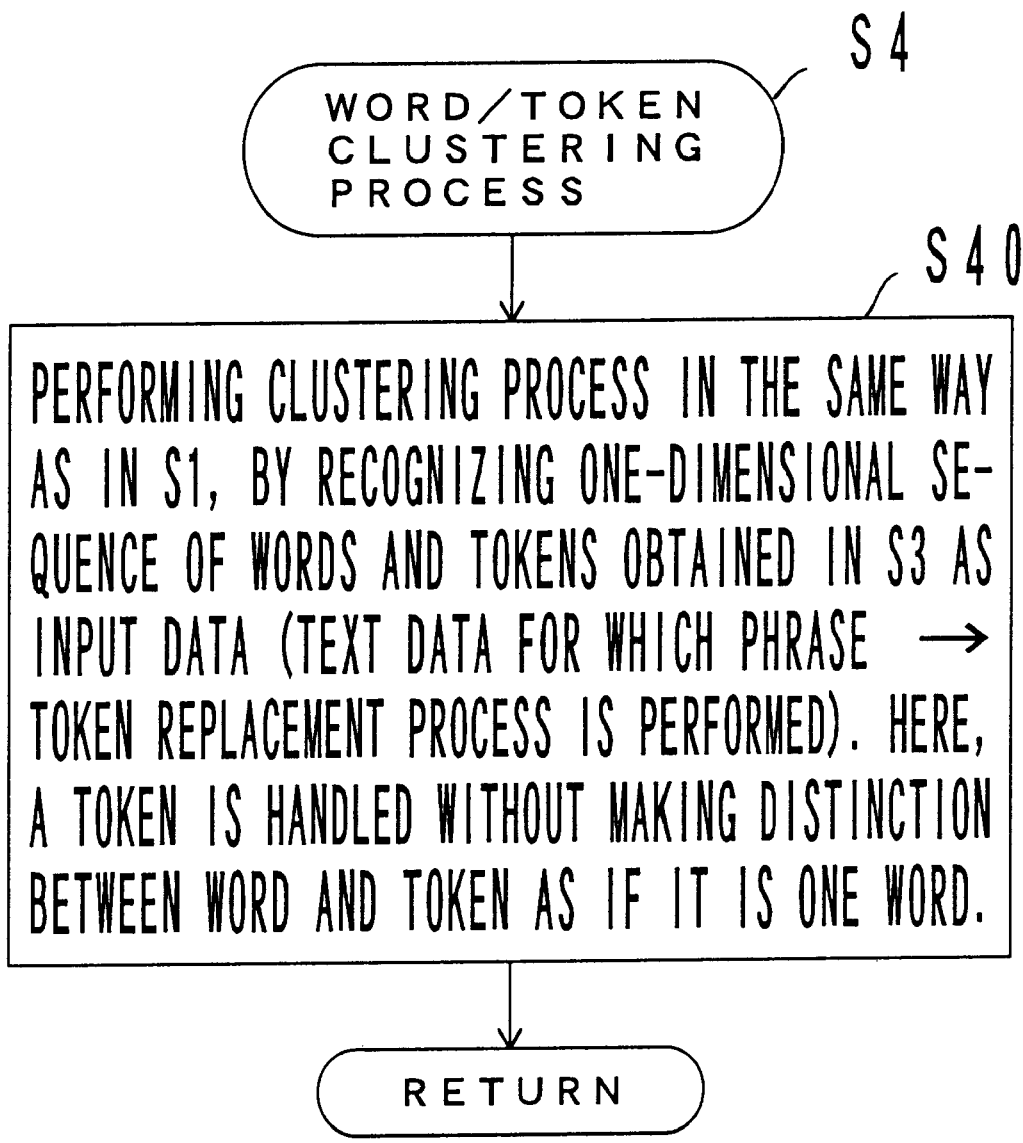
FIG. 21 is a flowchart showing a word/token clustering process performed by the word/phrase classification processing apparatus according to the embodiment of the present invention.

FIG. 21 is a flowchart showing the word/token clustering process performed in step S4.

In this figure, word/token classes $\{T_1, T_2, T_3, T_4, \ldots, T_D\}$ are generated by performing clustering for the one-dimensional sequence of words and tokens of the text data obtained in step S3 as input data, in the same way as in the first word clustering process performed in step S1. With the second clustering process, the distinction between a word and a token is not made, and the token is handled as one word. Furthermore, each of the generated word/token classes $\{T_1, T_2, T_3, T_4, \ldots, T_D\}$ includes a word and a token as its elements.

Then, a data output process is performed as shown in step S5 in FIG. 14. With the data output process, a word sequence corresponding to a token is extracted from word sequences included in a one-dimensional sequence of words in text data. Then, a third clustering process for separating a set including words and phrases into word/phrase classes $\{R_1, R_2, R_3, R_4, \ldots, R_D\}$, is performed by replacing the tokens included in the word/token classes $\{T_1, T_2, T_3, T_4, \ldots, T_D\}$ with corresponding phrases.

Figure 22:
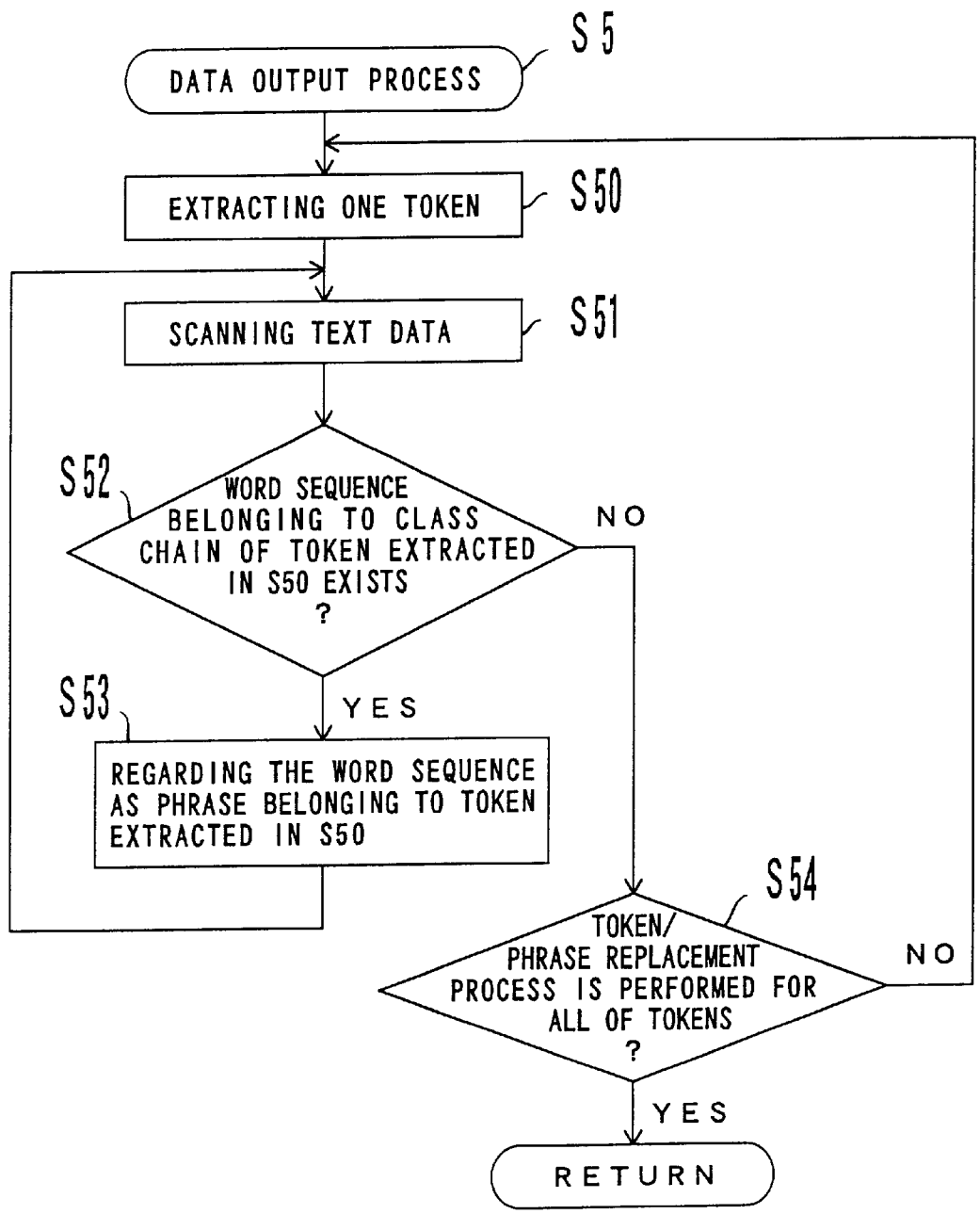
FIG. 22 is a flowchart showing a data output process performed by the word/phrase classification processing apparatus according to the embodiment of the present invention.

FIG. 22 is a flowchart showing the data output process performed in step S5.

In this figure, a token $t_K$ is extracted from a word/token class $T_i$ as shown in step S50.

Then, a one-dimensional sequence of words in text data is scanned in step S51, and it is determined whether or not there is a word sequence belonging to a word class sequence linked with a class chain, which corresponds to the token $t_K$ extracted in step S50, in step S52. If "YES", the process goes to step S53 to repeat the operations for regarding this word sequence as a phrase, and the token $t_K$ is replaced with phrases obtained by scanning the one-dimensional sequence of words in the text data.

If "NO", the process goes to step S54 to determine whether or not the data output process is performed for all of the tokens. If "NO", the process goes to step S50 to repeat the above described operations.

Assume that the token replacement process replaces word sequences ($W_1$ $W_2$), ($W_{13}$ $W_{14}$), . . . in a one-dimensional sequence of words ($W_1$ $W_2$ $W_3$ $W_4$ . . . $W_T$) in text data with a token $t_1$, and also replaces word sequences ($W_4$ $W_5$ $W_6$), ($W_{17}$ $W_{18}$), . . . with a token $t_2$ by token replacement process in step S3. In this case, phrases ($W_1$-$W_2$, $W_{13}$-$W_{14}$, . . . ) are extracted as the phrases corresponding to the token $t_1$ from the text data, while phrases ($W_4$-$W_5$-$W_6$, $W_{17}$-$W_{18}$, . . . ) are extracted as the phrases corresponding to the token $t_2$ from the text data.

Assuming that a word/token class $T_i$ is composed of a set of words $W_i$ and a set of tokens $J_i = \{t_{i1}, t_{i2}, \ldots, t_{in}\}$, the token class $T_i$ is represented by the $\{W_i \cup J_i\}$, and a token class $t_{im}$ included in the set of tokens $J_i$ is inversely replaced with the set of phrases $V_{im} = \{V_{im}^{(1)}, V_{im}^{(2)}, \ldots\}$, a word/phrase class $R_i$ is obtained by the following equation.

$$R_i = W_i \cup \left\{ \bigcup_{k=1}^{n} V_{ik} \right\}$$

With the word/phrase classification processing apparatus according to the embodiment of the present invention as described above, not only words, but word and phrase, or phrases are classified as one block by classifying word and phrase included in text data together, and generating a class in which the word and phrase exist together. As a result, the correspondence and similarity between word and phrase or between phrases can be determined with ease.

Additionally, a token is attached to a word class sequence of text data to regard the word class sequence as one word, and words included in the text data and the word class sequence to which a token is attached are equally handled and classified, so that a corresponding word class sequence is replaced with a word sequence included in the text data. Therefore, the classification process can be performed without making a distinction between word and phrase, and at the same time, phrases can be extracted from text data at high speed.

Furthermore, each of words structuring a word sequence of text data is replaced with a word class to which the word belongs, and a phrase included in the text data is extracted after a word class sequence whose frequency of appearances in the text data is equal to or more than a predetermined value, is extracted, so that the phrase can be extracted at high speed.

Provided next is the explanation about a speech recognition apparatus according to an embodiment of the present invention.

Figure 23:
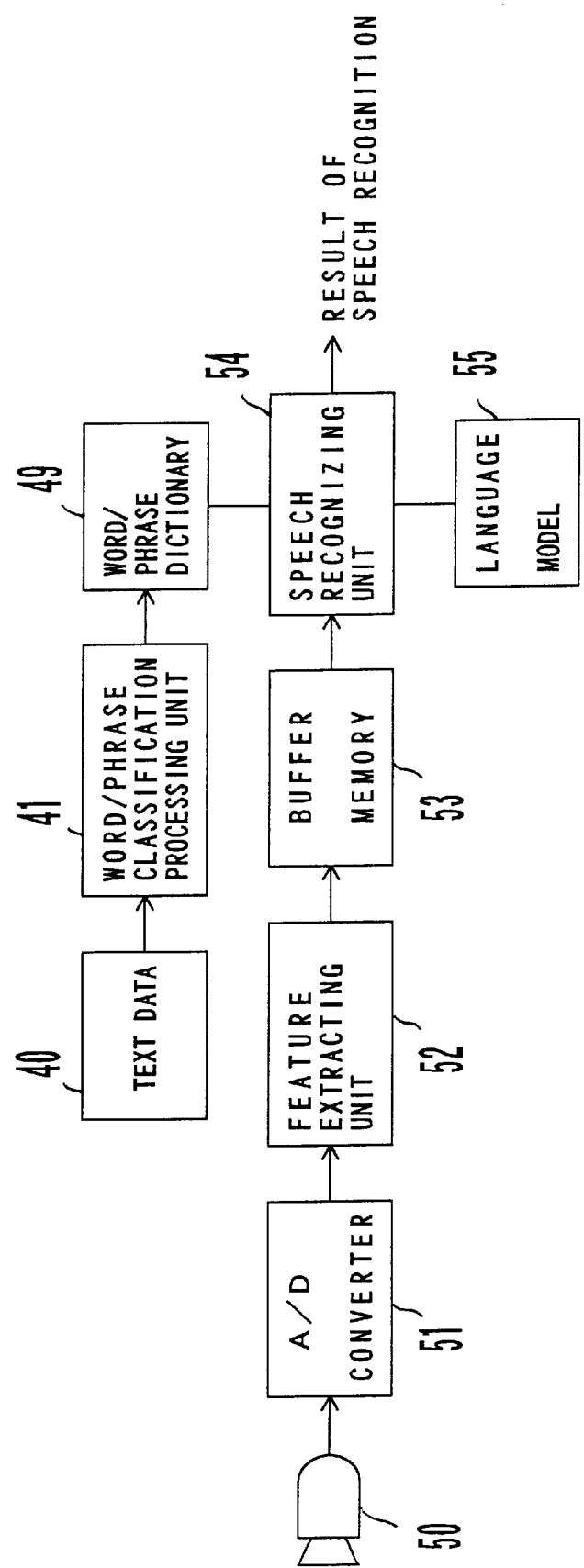
FIG. 23 shows a functional block diagram of a speech recognition apparatus according to the embodiment of the present invention.

FIG. 23 is a block diagram showing the configuration of the speech recognition apparatus for performing speech recognition by taking advantage of the result of a word/phrase classification process obtained by the word/phrase classification processing apparatus shown in FIG. 1.

In this figure, words and phrases included in predetermined text data 40 are classified as a class in which the words and phrases exist together by a word/phrase classification processing unit 41. The classified words and phrases are stored in a word/phrase dictionary 49.

In the meantime, after uttered speech composed of a plurality of words and phrases is converted into analog speech signals by a microphone 50, they are converted into digital speech signals by an A/D converter 51. Then, they are input to a feature extracting unit 52. The feature extracting unit 52, performs, for example, LPC analysis for digital speech signals to extract feature parameters such as a cepstrum coefficient, logarithmic power, etc. The feature parameters extracted by the feature extracting unit 52 are output to a speech recognizing unit 54 to perform speech recognition for each word and each phrase by referencing a language model 55 such as a phoneme-hidden Markov model, and by referencing the result of classifying words and phrases stored in the word/phrase dictionary 49.

Figure 24:
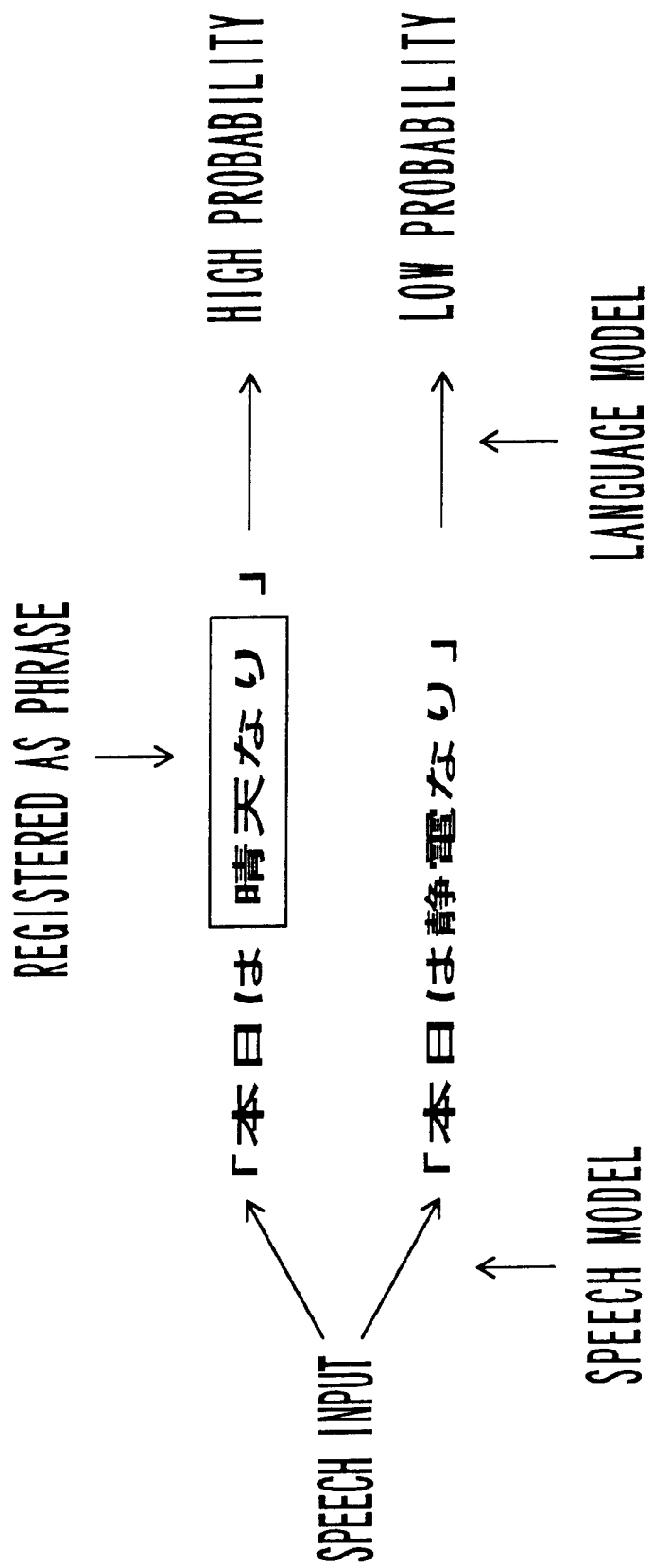
FIG. 24 shows a speech recognition method according to the embodiment of the present invention.

FIG. 24 exemplifies the case in which speech recognition is performed by taking advantage of the result of classifying words and phrases.

In this figure, an uttered sentence "本日は晴天なり" is input to the microphone 50, and a speech model is applied to this uttered sentence, so that the recognition results, for example, "本日は晴天なり" and "本日は静電なり" are obtained. As a result of performing a process using a language model and referencing the word/phrase dictionary 49 for the recognition results obtained by using the speech model, a high probability is given to the recognition result "本日は晴天なり", while a low probability is given to the recognition result "本日は静電なり", on the condition that the phrase "晴天なり" is registered in the word/phrase dictionary 49.

With the speech recognition apparatus according to the embodiment of the present invention as described above, speech recognition is performed by referencing the word/phrase dictionary 49 and using the correspondence or similarity between word and phrase or between phrases, thereby enabling a recognition process with higher accuracy.

Provided next is the explanation about a machine translation apparatus according to an embodiment of the present invention.

Figure 25:
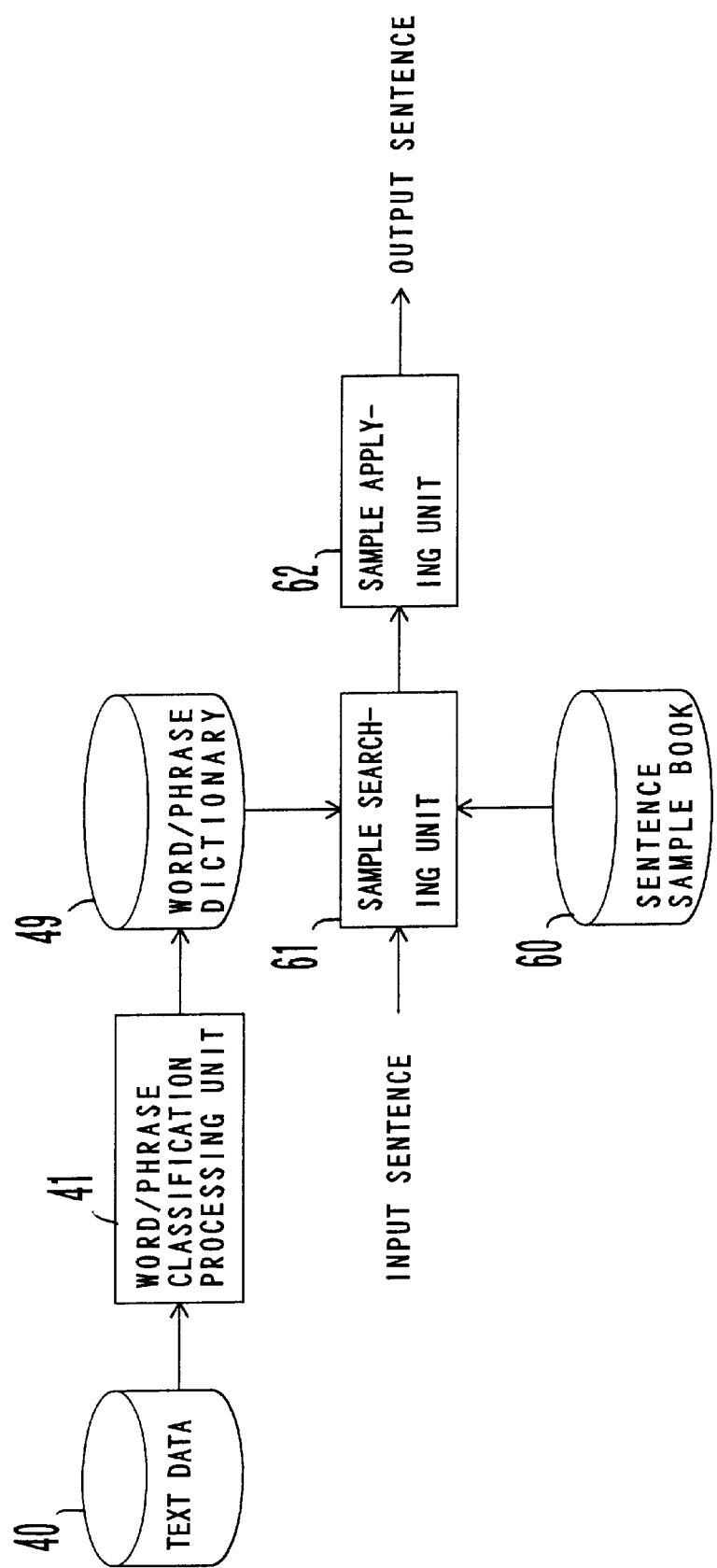
FIG. 25 shows a functional block diagram of a machine translation apparatus according to the embodiment of the present invention.

FIG. 25 is a block diagram showing the configuration of a machine translation apparatus for performing machine translation using a result of a word/phrase classification process obtained by the word/phrase classification processing apparatus shown in FIG. 1.

In this figure, word and phrase included in predetermined text data 40 are classified as a class in which the word and phrase exist together, by the word/phrase classification processing unit 41. The classified word and phrase is then stored in the word/phrase dictionary 49. An original sentence sample and a translated sentence sample corresponding to the original sentence sample are stored in a sentence sample book 60 in a one-to-one correspondence.

If an original sentence is input to a sample searching unit 61, classes to which words included in the input original sentence belong are searched by referencing the word/phrase dictionary 49, and an original sentence sample composed of words and phrases belonging to classes identical to these classes is retrieved from the sentence sample book 60. The original sentence sample and its corresponding translated sentence sample are input to a sample applying unit 62. The words in the input original sentence are replaced with corresponding translated words in the translated sentence sample, so that a translated sentence corresponding to the input original sentence is generated.

Figure 26:
FIG. 26 shows a machine translation method according to the embodiment of the present invention.

FIG. 26 exemplifies the case in which speech recognition is performed using a result of word/phrase classification process.

Assume that "Toyota" and "Kohlberg Kravis Roberts & Co." belong to an identical class, "gained" and "lost" belong to an identical class, "2" and "1" belong to an identical class, and "30¼" and "80½" belong to an identical class, in FIG. 26.

When "Toyota gained 2 to 30¼." is input as an original sentence, "Kohlberg Kravis Roberts & Co. lost 1 to 80½." is retrieved as an original sentence sample from the sentence sample book 60, and a translated sentence sample "Kohlberg Kravis Roberts & Co. 社は、 1 ドル値を下げて終値 80½ ドルだった。", which corresponds to the original sentence sample is retrieved.

Then, a translated word "Kohlberg Kravis Roberts & Co. 社" in the translated sentence sample is replaced with a translated word "トヨタ" corresponding to the original word "Toyota" in the input original sentence belonging to the same class including the original phrase "Kohlberg Kravis Roberts & Co." in the original sentence sample; a translated word "下げて" in the translated sentence sample is replaced with a translated word "上げて" corresponding to an original word "gained" in the input original sentence belonging to the same class including an original word "lost" in the original sentence sample; a numerical value "1" included in the translated sentence sample is replaced with "2"; and the numerical value "80½" included in the translated sentence sample is replaced with "30¼". As a result, a translated sentence "トヨタは、 2 ドル値を上げて終値 30¼ ドルだった。" corresponding to the input original sentence is output.

With the machine translation apparatus according to the embodiment of the present invention as described above, machine translation is performed by referencing the word/phrase dictionary 49 and applying an original sentence sample to an input original sentence, even if an original sentence which is a variation of an original sentence sample, and includes a phrase replacing an original word included in the original sentence sample, is input, machine translation can be performed by applying the original sentence sample to the input original sentence. Therefore, accurate machine translation can be performed using the correspondence or similarity between word and phrase or between phrases.

The explanation about the embodiment of the present invention is provided above. However, this invention is not limited to the above described embodiment. A variety of changes can be made in a scope of technical concept of the present invention. For example, the above described embodiment refers to the case in which the word/phrase classification processing apparatus is applied to the speech recognition apparatus and machine translation apparatus. The word/phrase classification processing apparatus may also be applied to a character recognition apparatus. Furthermore, the above described embodiment refers to the case in which word and phrase are classified as a mixture, but only phrases may be extracted and classified.

What is claimed is:

1. A word/phrase classification processing method, comprising the steps of:

performing a first clustering process by extracting "V" different words from text data as a one-dimensional sequence of a plurality of words, and separating a set of the "V" different words into "C" word classes;

extracting a set of word class sequences in which all of the degrees of stickiness between contiguous word classes are equal to or more than a predetermined value, in a one-dimensional sequence of word classes concerning the text data generated based on the first clustering process;

generating a one-dimensional sequence of words and tokens concerning the text data by corresponding a specific token to a word class sequence, searching a word sequence belonging to the word class sequence for the text data, and replacing the word sequence in the text data with a corresponding token;

performing a second clustering process, by extracting different words and tokens from the one-dimensional sequence of words and tokens concerning the text data, and separating a set of extracted words and tokens into word/token classes; and performing a third clustering process by extracting a word sequence corresponding to a token as a phrase, from word sequences included in the text data, replacing the token in the word/token class with the phrase, and separating the set of extracted words and phrases into word/phrase classes.

2. The word/phrase classification processing method according to claim 1, wherein:

the first clustering process is performed based on an average mutual information between word classes.

3. The word/phrase classification processing method according to claim 1, wherein:

the second clustering process is performed based on an average mutual information between word/token classes.

4. A word/phrase classification processing method, comprising t he steps of:

generating word classes into which words included in text data are classified;

generating a one-dimensional sequence of word classes by mapping the word classes to a one-dimensional sequence of words included in the text data;

extracting a word class sequence in which all of the degrees of stickiness between contiguous word classes are equal to or more than a predetermined value, in the one-dimensional sequence of word classes concerning the text data, from the one-dimensional sequence of word classes of the text data;

classifying the words and the word class sequences, which are included in the text data, together;

extracting a phrase by taking out respective words which exist contiguously in the text data, from respective word classes structuring the word class sequence; and replacing the word class sequence with a phrase belonging to the word class sequence.

5. A phrase extraction method, comprising the steps of:

generating word classes into which words included in text data are classified;

generating a one-dimensional sequence of word classes by mapping the word classes to a one-dimensional sequence of words included in the text data;

extracting a word class sequence in which all of the degrees of stickiness between contiguous word classes are equal to or more than a predetermined value, in the one-dimensional sequence of word classes of the text data, from the one-dimensional sequence of word classes of the text data; and extracting a phrase by taking out respective words which exist contiguously in the text data, from respective word classes structuring the word class sequence.

6. A word/phrase classification processing apparatus, comprising:

word classifying means for generating word classes by extracting different words from a one-dimensional sequence of words included in text data, and separating a set of extracted words;

word class sequence generating means for generating a one-dimensional sequence of word classes concerning the text data by replacing respective words structuring a one-dimensional sequence of words included in the text data with the word classes to which the different words belong;

word class sequence extracting means for extracting a word class sequence in which all of the degrees of stickiness between contiguous word classes are equal to or more than a predetermined value, in the one-dimensional sequence of word classes concerning the text data, from the one-dimensional sequence of word classes concerning the text data;

token attaching means for attaching a token to each word class sequence extracted by the word class sequence extracting means;

word/token sequence generating means for generating a one-dimensional sequence of words and tokens concerning the text data by replacing a word sequence belonging to the word class sequence extracted by the word class sequence extracting means, from the one-dimensional sequence of words included in the text data, with the token;

word/token classifying means for generating a word/token class by separating a set of words and tokens, which are included in the one-dimensional sequence of words and tokens concerning the text data; and phrase replacing means for generating a phrase by inversely replacing the token in the word/token class, with a word sequence which is replaced by the word/token sequence generating means.

7. The word/phrase classification processing apparatus according to claim 6, wherein:

the word classifying means comprises:

initialization class assigning means for extracting the different words from the one-dimensional sequence of words included in the text data, and assigning a specific word class to each of extracted words having a predetermined frequency of appearances;

temporary merging means for extracting two word classes from a set of word classes, and temporarily merging extracted word classes;

average mutual information amount calculating means for calculating an average mutual information about temporarily-merged word classes of the text data; and merging means for actually merging two word classes which maximize the average mutual information, which are included in the set of word classes.

8. The word/phrase classification processing apparatus according to claim 6, wherein:

the word class sequence extracting means comprises:

word class extracting out means for sequentially taking out two word classes which exist contiguously, from the one-dimensional sequence of word classes concerning the text data;

mutual information amount calculating means for calculating the amount of mutual information between two word classes taken out by the word class extracting means; and class chain linking means for linking two word classes whose amount of mutual information is equal to or more than a predetermined value, by using a class chain.

9. The word/phrase classification processing apparatus according to claim 6, wherein:

the word/token classifying means comprises:

initialization class assigning means for extracting different words and tokens from the one-dimensional sequence of words and tokens concerning the text data, and assigning a specific word/token class to each word and each token having a predetermined frequency of appearances;

temporary merging means for taking out two word/token classes from a set of word/token classes, and temporarily merging extracted word/token classes;

average mutual information amount calculating means for calculating an average mutual information about temporarily-merged word/token classes of the text data; and merging means for actually merging two word/token classes which maximize the average mutual information, which are included in the set of word/token classes.

10. A word/phrase classification processing apparatus, comprising:

a phrase extracting unit to extract a phrase formed of contiguous words from text data as a one-dimensional sequence of a plurality of words; and a word/phrase classifying unit to classify both a word included in the text data and the phrase extracted by said phrase extracting unit as one block, and generating a class in which the word and the phrase exist together.

11. The word/phrase classification processing apparatus according to claim 10, wherein:

the class is generated based on an average mutual information about classes.

12. A phrase extraction apparatus, comprising:

word classifying means for classifying words included in text data, and generating word classes;

word class sequence generating means for generating a one-dimensional sequence of word classes of the text data by replacing respective words structuring a one-dimensional sequence of words included in the text data, with the word classes to which the words belong;

word class sequence extracting means for extracting a word class sequence in which the degrees of stickiness between contiguous word classes are equal to or more than a predetermined value, in the one-dimensional sequence of word classes concerning the text data, from the one-dimensional sequence of word classes concerning the text data; and phrase extracting means for extracting a phrase by taking out respective words which exist contiguously in the text data from respective word classes structuring the word class sequence.

13. The word extraction apparatus according to claim 12, wherein:

the word classes are generated based on an average mutual information about word classes.

14. A storage medium, comprising:

a first storage area containing a data structure for word classes into which words included in text data as a one-dimensional sequence of a plurality of words are classified;

a second storage area containing a data structure for phrases, each formed of contiguous words extracted from the text data based on mutual information amounts of the word classes; and a third storage area containing a data structure for word/phrase classes where the phrases are classified in the word classes.

15. A computer-readable storage medium storing a program which includes instructions for making a computer perform the functions of:

generating word classes by extracting different words from a one-dimensional sequence of words included in text data, and separating a set of extracted words;

generating a one-dimensional sequence of word classes concerning the text data, by replacing respective words structuring the one-dimensional sequence of words included in the text data with the word classes to which the different words belong;

extracting a word class sequence in which all of the degrees of stickiness between contiguous word classes are equal to or more than a predetermined value, from the one-dimensional sequence of word classes concerning the text data;

attaching a token to the word class sequence;

generating a one-dimensional sequence of words and tokens concerning the text data by replacing a word sequence belonging to the word class sequence in the one-dimensional sequence of words included in the text data, with the token;

generating a word/token class by separating a set of words and tokens in the one-dimensional sequence of words and tokens concerning the text data; and generating a phrase by inversely replacing the token in the word/token class with the word sequence included in the text data.

* * * * *